(12) United States Patent
Harazono et al.

(10) Patent No.: US 8,163,997 B2
(45) Date of Patent: Apr. 24, 2012

(54) ELECTRONIC COMPONENT, LEAD-WIRE AND THEIR PRODUCTION METHODS

(75) Inventors: Kouhei Harazono, Yamaguchi (JP); Hiroshi Kurimoto, Yamaguchi (JP); Douyuu Hachisu, Yamaguchi (JP); Takanao Saitou, Yamaguchi (JP); Masami Kobayashi, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/597,309

(22) PCT Filed: Jul. 1, 2008

(86) PCT No.: PCT/JP2008/001721
§ 371 (c)(1),
(2), (4) Date: Oct. 23, 2009

(87) PCT Pub. No.: WO2009/011096
PCT Pub. Date: Jan. 22, 2009

(65) Prior Publication Data
US 2010/0108358 A1    May 6, 2010

(30) Foreign Application Priority Data

Jul. 19, 2007 (JP) .................................. 2007-187913
Feb. 20, 2008 (JP) .................................. 2008-038244

(51) Int. Cl.
*H01G 9/10* (2006.01)
(52) U.S. Cl. ..................................... 174/94 R; 361/520
(58) Field of Classification Search ................. 174/94 R; 361/520
See application file for complete search history.

(56) References Cited

U.S. PATENT DOCUMENTS

| | | | | |
|---|---|---|---|---|
| 2,939,060 A | * | 5/1960 | Cotton et al. | 361/308.3 |
| 3,302,072 A | * | 1/1967 | O'Neil | 361/519 |
| 3,356,913 A | * | 12/1967 | Earley | 361/520 |
| 3,534,230 A | * | 10/1970 | Krasienko et al. | 361/519 |
| 4,025,827 A | * | 5/1977 | Pellerin et al. | 361/519 |
| 4,962,446 A | | 10/1990 | Asakura et al. | |
| 6,130,598 A | | 10/2000 | Katsuki et al. | |
| 2005/0284654 A1 | * | 12/2005 | Sato | 174/252 |

FOREIGN PATENT DOCUMENTS

| | | |
|---|---|---|
| CN | 1093197 A | 10/1994 |
| EP | 2 061 048 A1 | 5/2009 |
| JP | 55-117834 U | 8/1980 |
| JP | 63-178318 U | 11/1988 |
| JP | 01164018 * | 6/1989 |
| JP | 5-73931 U | 10/1993 |
| JP | 2000-077257 A | 3/2000 |
| JP | 2007-103503 A | 4/2007 |
| KR | 10-0245563 B1 | 3/2000 |

OTHER PUBLICATIONS

Korean Office Action dated Aug. 26, 2011.
International Search Report for PCT/JP2008/001721.
Chinese Office Action dated Mar. 23, 2011.

\* cited by examiner

*Primary Examiner* — Chau Nguyen
(74) *Attorney, Agent, or Firm* — Pearne & Gordon LLP

(57) ABSTRACT

A lead-wire includes a led-out electrode made of metal and a cap. The cap is put over an end of the led-out electrodes, and is made of metal harder than the metal forming the led-out electrodes. An electronic component includes a functional element and the lead-wire. The led-out electrodes is led out of the functional element.

16 Claims, 13 Drawing Sheets

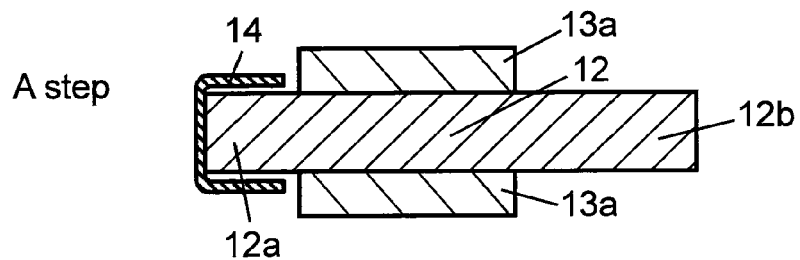
FIG. 3A  A step
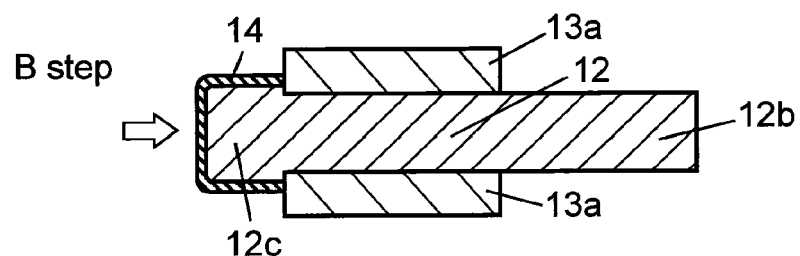
FIG. 3B  B step
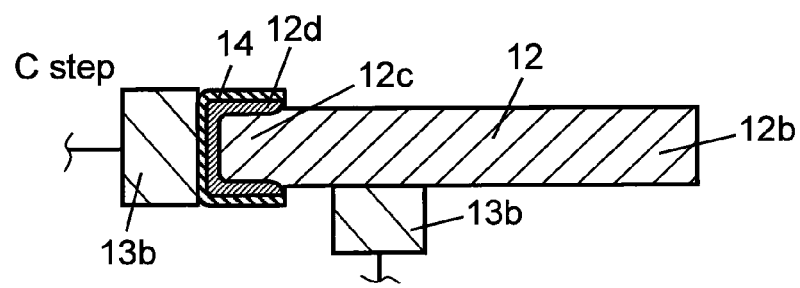
FIG. 3C  C step
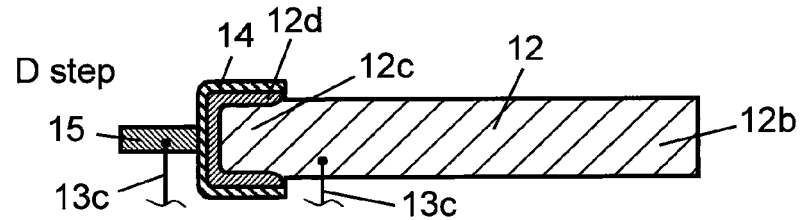
FIG. 3D  D step
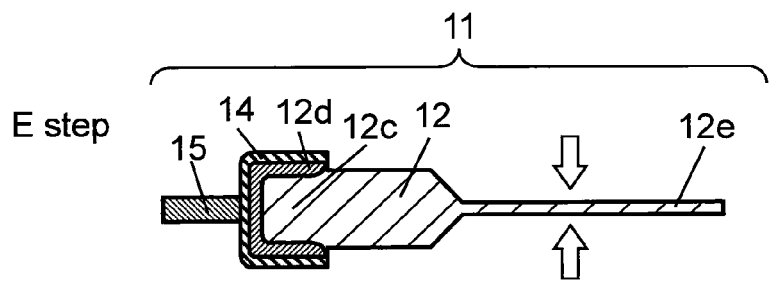
FIG. 3E  E step FIG. 4A  F step
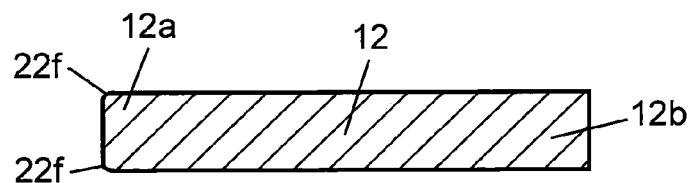
FIG. 4B  A step
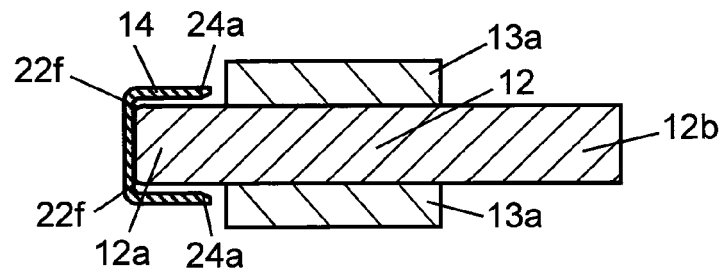

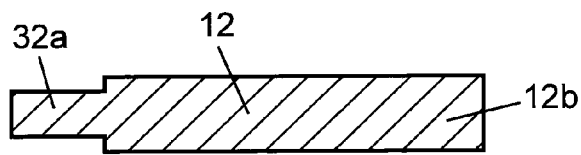
FIG. 7A  G step
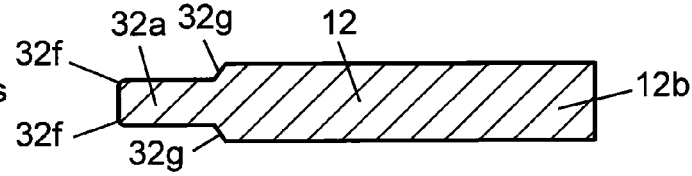
FIG. 7B  F,H steps
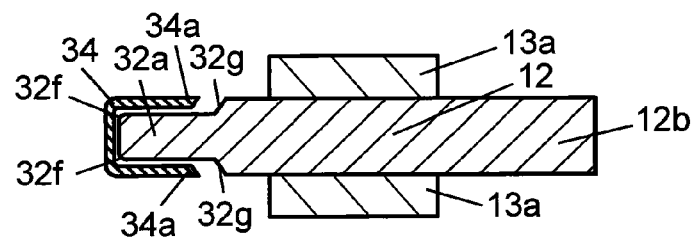
FIG. 7C  A step
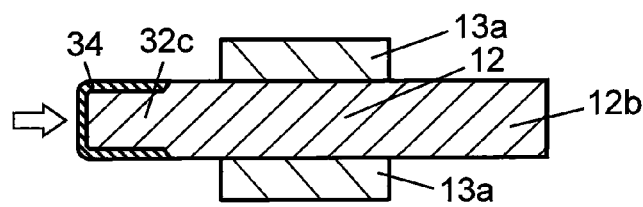
FIG. 7D  B step
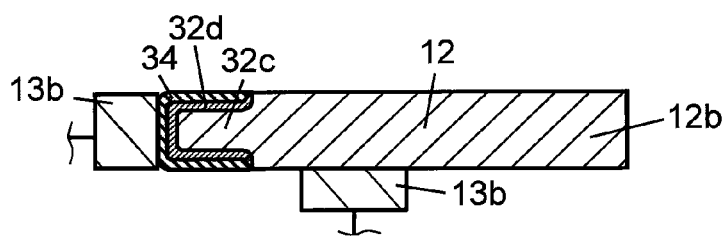
FIG. 7E  C step
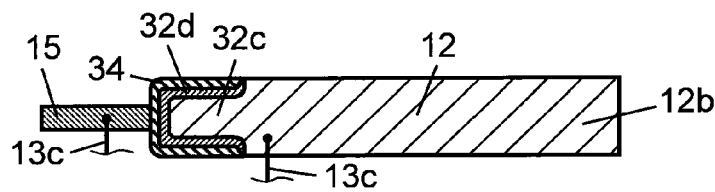
FIG. 7F  D step
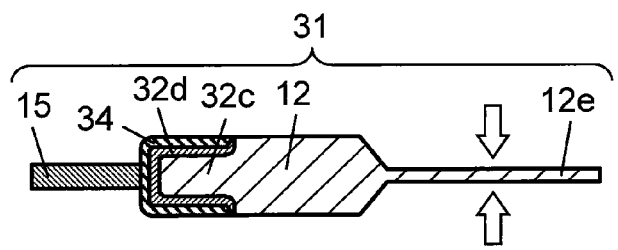
FIG. 7G  E step FIG. 8A  G step
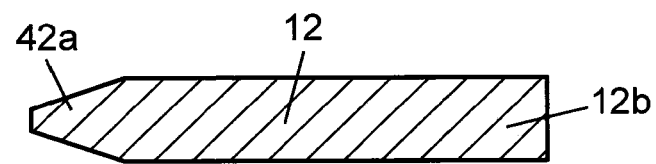
FIG. 8B  A step
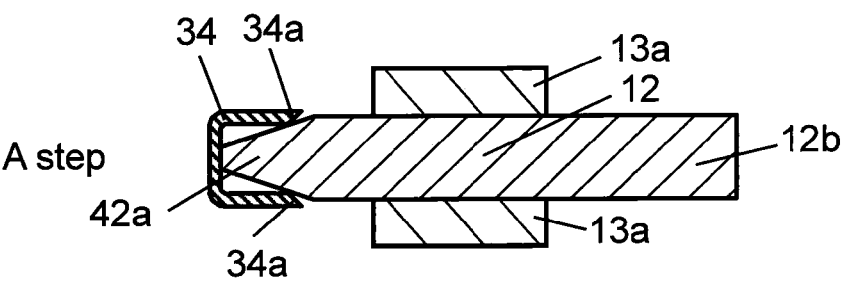

FIG. 11A  G,F,H steps
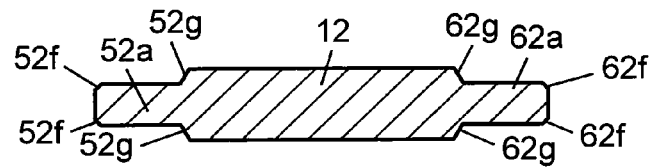
FIG. 11B  A step
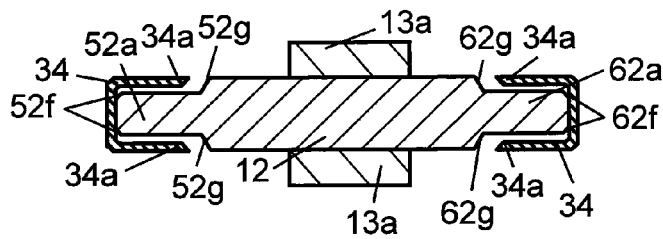
FIG. 11C  B step
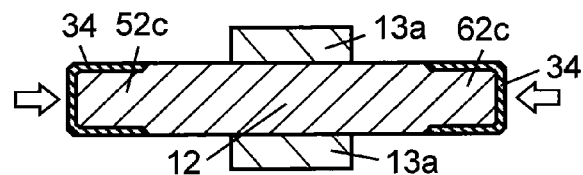
FIG. 11D  C step
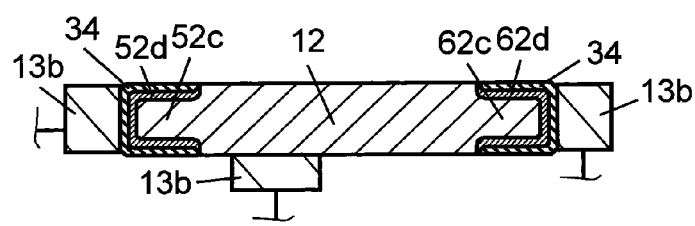
FIG. 11E  D step
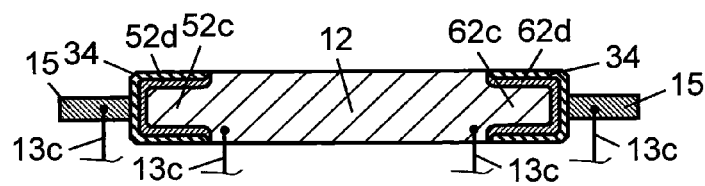
FIG. 11F  I step
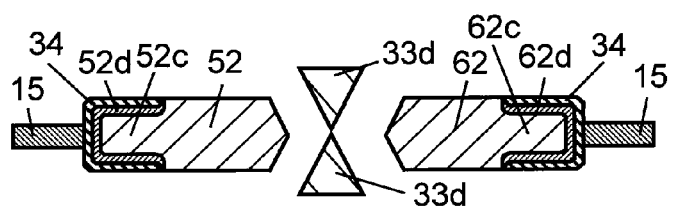
FIG. 11G  E step
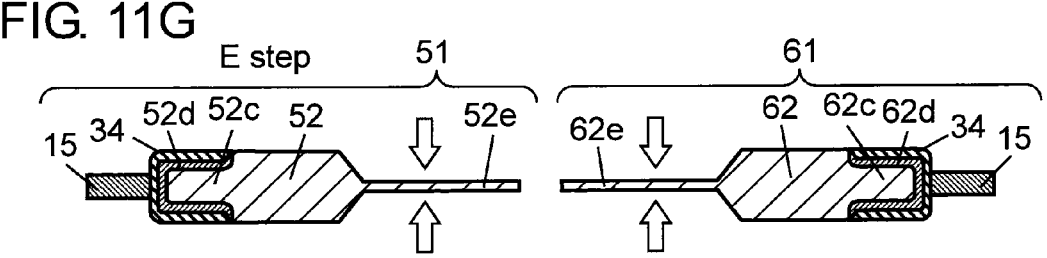

PRIOR ART

PRIOR ART

ELECTRONIC COMPONENT, LEAD-WIRE AND THEIR PRODUCTION METHODS

This Application is a U.S. National Phase Application of PCT International Application PCT/JP2008/001721.

TECHNICAL FIELD

The present invention relates to an electronic component and its lead-wire, and a method for manufacturing the lead-wire as well as the electronic component using the lead-wire, particularly the present invention relates to a capacitor having a sealing member through which the lead-wire extends.

BACKGROUND ART

FIG. 17 shows a sectional view of an aluminum electrolytic capacitor, i.e. one of conventional electronic components. FIG. 18 shows a perspective view of a lead-wire to be used in the aluminum electrolytic capacitor. FIG. 19 shows a sectional view of the lead-wire.

As shown in FIG. 17, the aluminum electrolytic capacitor is formed of capacitor element 6, which works as a functional element, lead-wire 1, housing 7, and sealing member 8. Lead-wire 1 is led out of capacitor element 6, and housing 7 shaped like a cylinder with a bottom accommodates capacitor element 6. Sealing member 8 is provided with through-holes 8a through which lead-wires 1 run. Sealing member 8 is placed at the opening of housing 7, and it is drawn at drawn section 7a provided on the outer wall of housing 7, whereby the opening of housing 7 is sealed.

As shown in FIG. 18, lead-wire 1 is formed of led-out electrode 2 made of aluminum round bar, cap 4, and flat section 2e. As shown in FIG. 19, cap 4 is put over first end 2a of led-out electrode 2. Flat section 2e is formed by pressing a second end of led-out electrode 2 into a flat shape, and is coupled to capacitor element 6. Cap 4 covering first end 2a works as a terminal to be coupled to circuit board 10, and it is made of the material ready to be soldered.

The aluminum electrolytic capacitor discussed above uses lead-wire 1 of which cap 4 covering first end 2a works as a terminal, so that malformations at a junction between first end 2a and the terminal can be reduced comparing with the malformations occurring when first end 2a is directly melted to a wire-like terminal. Quality of the aluminum electrolytic capacitor thus can be controlled with ease, and the highly reliable capacitor stable in bonding quality can be thus obtained. The aluminum electrolytic capacitor discussed above is disclosed in, e.g. patent literature 1.

However, in the case of fitting cap 4 to first end 2a by, e.g. press-fitting, for covering end 2a, cap 4 sometimes encounters deformation in appearance, or burrs are sometimes produced at the end of the opening of housing 7. When lead-wire 1 is inserted into through-hole 8a of sealing member 8, the deformation or the burr may incur a gap between the outer wall of cap 4 and the inner wall of through-hole 8a. Burrs produced on lead-wire 1 scratch the inner wall of through-hole 8a, so that the electrolyte tends to leak. The sealing reliability may be thus lowered. On top of that, the insertion of lead-wire 1 into through-hole 8a causes the burrs produced on lead-wire 1 to come off to capacitor element 6, and may invite a short.

Patent Literature 1: Japanese Utility Model Publication No. S63-178318

SUMMARY OF THE INVENTION

The present invention aims to provide an electronic component and a lead-wire to be used in this electronic component. The electronic component and the lead-wire achieve reducing burrs and deformation in appearance of a cap, where the deformation and the burrs are produced when the cap is put over and fit to a first end of a led-out electrode. The electronic component and the lead-wire of the present invention thus improve the air-tightness of the sealing of the component as well as the anti-short properties of the component. The present invention also aims to provide methods for manufacturing the component and the lead-wire.

The lead-wire of the present invention includes a led-out electrode made of metal, and a cap made of metal harder than the metal forming the led-out electrode. The end of led-out electrode is covered with the cap. The electronic component of the present invention is formed of a functional element and the foregoing lead-wire. The led-out electrode is led out of the functional element. The structure discussed above allows preventing the cap from being deformed in appearance when the cap is put over the end of the led-out electrode.

The outer diameter of the led-out electrode before it is covered with the cap at a first end is set smaller than the inner diameter of the cap. Then the first end of the led-out electrode is covered with the cap, and then a pressure is applied to the outer bottom of the cap, thereby deforming the first end of the led-out electrode made of the metal softer than the metal of the cap while the cap stays free from being deformed. An outer end-face of the first end of the led-out electrode thus can be press-fitted to an inner face of the cap. Therefore, an inner brim of an opening of the cap does not bite an outer brim of the first end of the led-out electrode when putting the cap on the end of the led-out electrode. As a result, burrs produced on the brim of the opening of the cap can be reduced.

BRIEF DESCRIPTION OF DRAWINGS

FIG. 3A is a sectional view of one of manufacturing steps of a lead-wire to be used in the aluminum electrolytic capacitor shown in FIG. 1.

FIG. 3B is a sectional view of a step following the step shown in FIG. 3A for manufacturing the lead wire.

FIG. 3C is a sectional view of a step following the step shown in FIG. 3B for manufacturing the lead wire.

FIG. 3D is a sectional view of a step following the step shown in FIG. 3C for manufacturing the lead wire.

FIG. 3E is a sectional view of a step following the step shown in FIG. 3D for manufacturing the lead wire.

FIG. 4A is a sectional view of a step to be done prior to the step shown in FIG. 3A for manufacturing the lead wire.

FIG. 4B is a sectional view of a step following the step shown in FIG. 4A for manufacturing the lead wire.

FIG. 7A is a sectional view of one of manufacturing steps of a lead-wire to be used in the aluminum electrolytic capacitor shown in FIG. 5.

FIG. 7B is a sectional view of a step following the step shown in FIG. 7A for manufacturing the lead wire.

FIG. 7C is a sectional view of a step following the step shown in FIG. 7B for manufacturing the lead wire.

FIG. 7D is a sectional view of a step following the step shown in FIG. 7C for manufacturing the lead wire.

FIG. 7E is a sectional view of a step following the step shown in FIG. 7D for manufacturing the lead wire.

FIG. 7F is a sectional view of a step following the step shown in FIG. 7E for manufacturing the lead wire.

FIG. 7G is a sectional view of a step following the step shown in FIG. 7F for manufacturing the lead wire.

FIG. 8A is a sectional view of one of other manufacturing steps of the lead-wire to be used in the aluminum electrolytic capacitor shown in FIG. 5.

FIG. 8B is a sectional view of a step following the step shown in FIG. 8A for manufacturing the lead wire.

FIG. 11A is a sectional view of one of manufacturing steps of a lead-wire to be used in the film capacitor shown in FIG. 9.

FIG. 11B is a sectional view of a step following the step shown in FIG. 11A for manufacturing the lead wire.

FIG. 11C is a sectional view of a step following the step shown in FIG. 11B for manufacturing the lead wire.

FIG. 11D is a sectional view of a step following the step shown in FIG. 11C for manufacturing the lead wire.

FIG. 11E is a sectional view of a step following the step shown in FIG. 11D for manufacturing the lead wire.

FIG. 11F is a sectional view of a step following the step shown in FIG. 11E for manufacturing the lead wire.

FIG. 11G is a sectional view of a step following the step shown in FIG. 11F for manufacturing the lead wire.

DETAILED DESCRIPTION OF PREFERRED EMBODIMENTS

Exemplary embodiments of the present invention are demonstrated hereinafter with reference to the accompanying drawings. Structural elements similar to those used in preceding embodiments have the same reference signs, and the descriptions thereof may be omitted. Only the structural elements different from those used in the preceding embodiments are described.

First Embodiment

Figure 1:
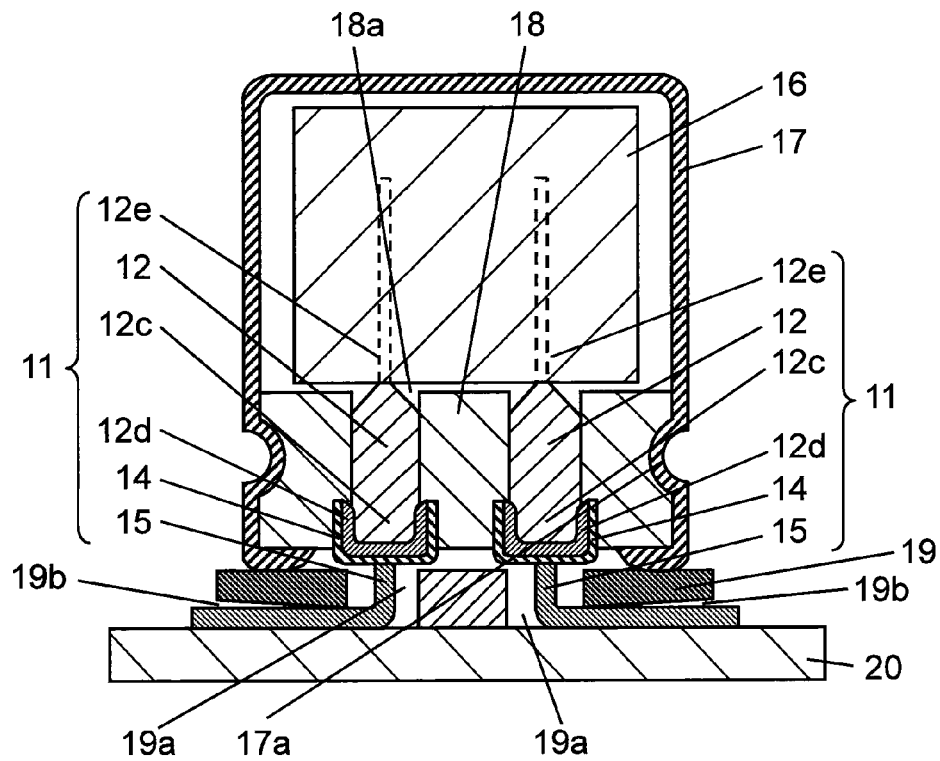
FIG. 1 is a sectional view of an aluminum electrolytic capacitor, which is an example of an electronic component in accordance with a first embodiment of the present invention.
Figure 2:
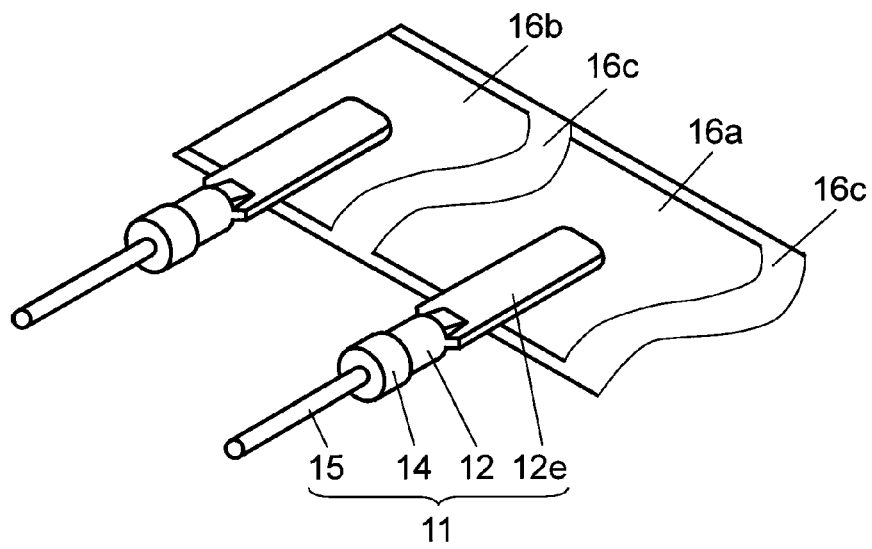
FIG. 2 is an exploded perspective view which is partially cut, illustrating a part of a capacitor element of the aluminum electrolytic capacitor shown in FIG. 1.

FIG. 1 is a sectional view of an aluminum electrolytic capacitor, which is an example of an electronic component in accordance with the first embodiment of the present invention. FIG. 2 is an exploded perspective view which is partially cut, illustrating a part of a capacitor element of the aluminum electrolytic capacitor shown in FIG. 1. FIGS. 3A-3E are sectional views of a lead-wire placed in respective manufacturing steps for processing the lead-wire to be used in the aluminum electrolytic capacitor.

First, the structures of the aluminum electrolytic capacitor and the lead-wire to be used in this capacitor are described with reference to FIGS. 1 and 2. As shown in FIG. 1, this capacitor is formed of capacitor element 16 working as a functional element, housing 17, sealing member 18, and electrically insulating terminal board 19. Capacitor element 16 is connected with a pair of lead-wires 11, and housing 17 shaped like a cylinder having a bottom accommodates capacitor element 16. Sealing member 18 is provided with through-holes 18a through which lead-wires 11 extend, and seals the opening of housing 17. Insulating terminal board 19 is provided with through-hole 19a, and grooves 19b are provided on the outer surface of board 19. Terminals 15 of lead-wires 11 led out of sealing member 18 are routed through the hole 19a, and bent approx. at right angles for being accommodated in grooves 19b. Insulating terminal board 19 is placed such that it closely touches the opening of housing 17.

Each one of lead-wires 11 is formed of cylindrical led-out electrode 12 made of metal, cap 14 made of metal, and wire-like terminal 15. Cap 14 is made of material harder than that of led-out electrode 12. First end 12c of electrode 12 is covered with cap 14. Terminal 15 is welded onto the outer surface of cap 14. The outer surface of first end 12c is press-fitted to the inner wall of cap 14, and metal diffused layer 12d is formed on at least parts of the interface between cap 14 and first end 12c, thereby bonding cap 14 and first end 12c together. A second end of led-out electrode 12 coupled to capacitor element 16 is processed into flat, thereby forming flat section 12e.

Cap 14 is made of material harder than that of led-out electrode 12. That means cap 14 has greater strength against deformation than first end 12c. In a case where led-out electrode 12 is made of aluminum round bar, the material of cap 14 can be selected from the metals harder than aluminum, such as iron, nickel, iron-nickel alloys. Other than the foregoing base materials of cap 14, factors related to the strength, such as a thickness of respective parts of cap 14, are preferably taken into consideration.

The inner wall of cap 14 can be plated in order to obtain stronger adhesion to first end 12c. It can be plated with, e.g. tin, nickel, or copper. In a case where led-out electrode 12 is made of aluminum round bar and cap 14 is made of iron, for example, it is preferable to provide the iron surface with a primary layer of copper, and a plated layer of tin or nickel. It is preferable to provide at least on the inner wall of cap 14 with the foregoing plated layer.

Terminal 15 is formed of a plate or a wire made of iron, nickel, copper, iron-alloy, nickel-alloy, or copper-alloy: Terminal 15 can be plated on the surface with tin or tin-alloy which contains silver, bismuth, indium, or lead to be ready for connecting with circuit board 20.

As shown in FIG. 2, led-out electrode 12 is bonded to anode foil 16a or cathode foil 16b at flat section 12e by an ultrasonic welding method or a pressure welding method. Anode foil 16a and cathode foil 16b are made of valve action metal such as aluminum. Capacitor element 16, working as a functional element, is formed by rolling up anode foil 16a and cathode foil 16b together with separator 16c placed therebetween. The functional element in this context generally refers to one of active elements and passive elements responsible for electrical functions. For instance, the capacitor element is the one for the capacitor, a battery element or an electrode-group is the one for the battery, and a semiconductor element is the one for the semiconductor.

Housing 17 is made of metal such as aluminum or aluminum-alloy, and accommodates capacitor element 16 together with electrolytic solution and/or solid electrolyte (not shown) of conductive polymer. Housing 17 is sealed at the opening with elastic sealing member 18 provided on the inner wall of the opening. To be more specific, elastic sealing member 18 receives a stress produced at drawn section 17a provided on a part of outer wall of housing 17.

Through-hole 18a formed in sealing member 18 receives terminals 15 of lead-wires 11, cap 14, and led-out electrodes 12 running through hole 18a in this order. Terminals 15 are led out of sealing member 18 while led-out electrodes 12 are brought into contact with the inner walls of through-holes 18a. A diameter of hole 18a is set equal to or a little bit smaller than the outer diameter of led-out electrode 12. Sealing member 18 receives the stress produced at drawn section 17a and is pressed, thereby air-tightly sealing the led-out electrodes 12 and the sealing member 18 together.

Insulating terminal board 19 is brought into contact with the opening of housing 17, and terminal 15 extends through hole 19a provided to board 19 and then bent at approx. right angles. The end of terminal 15 is accommodated in groove 19b formed on the surface of board 19. Insulating terminal board 19 is made of thermoplastic resin such as polyethylene, polypropylene, polyethylene terephthalate and liquid crystal polymer, or thermosetting resin such as phenol resin and epoxy resin.

A part of terminal 15 accommodated in groove 19b can be processed into a flat shape by pressing so that solder fillet can be readily formed on terminal 15 when terminal 15 is soldered to circuit board 20.

Next, a method of manufacturing the lead-wire 11 is demonstrated hereinafter with reference to FIGS. 3A-3E. First as shown in FIG. 3A, led-out electrode 12 is held with chucking jig 13a at the outer wall such that first end 12a of electrode 12 is exposed before first end 12a is deformed. Then first end 12a is covered with cap 14 (step A). Led-out electrode 12 is formed of cylindrical wire rod, and cap 14 is made by pressing a metal sheet made of material harder than that of led-out electrode 12 so that cap 14 has an opening. The inner diameter of the opening of cap 14 is set greater than the outer diameter of first end 12a, so that the outer wall of first end 12a is not yet press-fitted to the inner wall of cap 14 at this stage, and there is a gap between the outer wall and the inner wall.

Next, as shown in FIG. 3B, first end 12a is deformed within cap 14, thereby forming first end 12c deformed. Then the inner wall of cap 14 is press-fitted to the outer wall of first end 12c (step B). To be more specific, step B is carried out in the following way; first, the inner bottom of cap 14 is brought into contact with the top of first end 12a, then a pressure is mechanically applied onto the outer bottom of cap 14. This pressure greatly deforms the outer shape of first end 12a while cap 14 stays as it is because first end 12a is made of the material softer than that of cap 14. As a result, deformed first end 12c can be formed, and the outer face of first end 12c is press-fitted to the inner face of cap 14.

Since first end 12a is deformed into first end 12c by a press and is press-fitted to cap 14, the outer diameter of the main body of led-out electrode 12 gets different from the outer diameter of first end 12c.

The mechanical press onto the outer bottom face of cap 14 can be done, for example, in the following ways; pressing a pin touching the outer bottom of cap 14, or giving an instantaneous impact to the outer bottom with a hammer or the like. It is preferable to provide the outer bottom with a flat section in order to carry out the foregoing methods.

It is also preferable to provide a guide contacting the periphery of cap 14 along the direction cap 14 is pressed in order to carry out the foregoing methods. The guide allows readily aligning the center axis of cap 14 with the center axis of led-out electrode 12 when the outer bottom face of cap 14 is mechanically pressed.

Then, as shown in FIG. 3C, welding electrodes 13b are connected to the outer bottom of cap 14 and led-out electrode 12, respectively, and cap 14 and electrode 12 is heated by an electrical welding method such as an arc welding method and a resistance welding method (step C). Instead of the foregoing methods, a gas burner, laser, or electromagnetic induction can be used for heating the outer face of cap 14. The foregoing heat application allows cap 14 and led-out electrode 12 to be melted at an interface formed therebetween by pressure-welding. Metal diffused layer 12d, which contains the metals forming cap 14 and electrode 12, is formed on at least parts of this interface.

Next, as shown in FIG. 3D, terminal 15 is connected to the outer face of cap 14 (step D). To be more specific, wire-like terminal 15 is pressed onto the outer face of cap 14, and then welding electrodes 13c are connected to terminal 15 and the main body of led-out electrode 12, respectively. Then, terminal 15 is bonded to cap 14 with the resistance welding method or the like by using welding electrodes 13c. Terminal 15 can be shaped like a plate instead of a wire-like shape.

Then, as shown in FIG. 3E, second end 12b, which is not covered with cap 14, is deformed to form flat section 12e (step E). When capacitor element 16 is connected to led-out electrode 12, flat section 12e is connected to anode foil 16a or cathode foil 16b as shown in FIG. 2 by crimping or ultrasonic welding. Step E can be carried out in the following way; second end 12b is pinched at the outer side face and pressed so as to be a flat shape axially parallel with cylindrical led-out electrode 12, and then cut the peripheries of the flat shape to form flat section 12e having a predetermined width and length. Second end 12b is not necessarily deformed into the flat shape, but it can be deformed or processed into a shape appropriate to an electrode of the functional element. Lead-wire 11 can be thus manufactured through steps A-E discussed above.

Next, a method for manufacturing an aluminum electrolytic capacitor, which is an example of the electronic component using lead-wire 11 discussed above, in accordance with the present embodiment is demonstrated hereinafter.

First, anode foil 16a, cathode foil 16b and separator 16c are cut into shapes having predetermined widths and lengths as shown in FIG. 2. Anode foil 16a has a dielectric layer made of oxide film on the surface. Next, a pair of lead-wires 11 manufactured through steps A-E are connected to anode foil 16a and cathode foil 16b at flat section 12e by crimping or ultrasonic welding, respectively, then separator 16c is interposed between anode foil 16a and cathode foil 16b and they are wound together into a cylindrical shape. The periphery of the cylindrical shape is applied with an insulating adhesive tape or the like (not shown) so that the cylindrical shape can be fixed. Capacitor element 16 can be thus formed.

The electrode of the functional element can be a sintered body or formed by layering multiple foils instead of winding anode foil 16a and cathode foil 16b together.

Next, as shown in FIG. 1, capacitor element 16 is accommodated in housing 17 together with the electrolytic solution containing electrolyte. Then, a pair of lead-wires 11 led out of capacitor element 16 is inserted into a pair of through-holes 18a formed in sealing member 18, respectively. In this state, sealing member 18 is placed at the opening of housing 17. The electrolytic solution can be replaced with solid electrolyte such as conductive polymer, e.g. polypyrrole or polythiophene, or it can be used together with the solid electrolyte.

Then housing 17 is drawn from the periphery at the outer wall to form drawn section 17a, thereby sealing the opening of housing 17. Next, insulating terminal board 19 is placed such that it touches the opening of housing 17. Terminals 15 of the pair of lead-wires 11 led out of the outer face of sealing member 18 are inserted into a pair of through-holes 19a formed in board 19.

After that, terminals 15 extending from through-holes 19a are bent at right angles in the counter directions to each other, and terminals 15 are put into groove 19b formed on the outer surface of insulating terminal board 19. The surface-mounted type aluminum electrolytic capacitor is thus manufactured.

When there is a need to make the end of terminal 15 accommodated in groove 19b flat, terminal 15 should be pressed into a flat shape by pressing or the like before terminal 15 is run into through-hole 19a.

In the case of using solid electrolyte in capacitor element 16, such as conductive polymer, insulating resin such as epoxy resin can be used as an exterior material instead of using housing 17 and sealing member 18. In this case, capacitor element 16 is covered with the exterior resin, and terminals 15 of lead-wires 11 are led out of the exterior resin.

After sealing the opening of housing 17, or after mounting insulating terminal board 19, a voltage may be applied across terminals 15 appropriately for re-anodizing the capacitor element.

As discussed above, lead-wire 11 in accordance with the present embodiment and the method for manufacturing lead-wire 11 prove that cap 14 is made of material harder than that of led-out electrode 12, so that the appearance of cap 14 is prevented from being deformed when cap 14 is put over first end 12a.

The outer diameter of first end 12a, which is not yet covered with cap 14, is smaller than the inner diameter of cap 14. When cap 14 is put over first end 12a and is pressed at the outer bottom face, first end 12a is deformed by this press into first end 12c while cap 14 stays free from deformation. As a result, the outer face of first end 12c can be press-fitted to the inner face of cap 14. Therefore, the inner brim of the opening of cap 14 is prevented from biting the outer brim of first end 12a when cap 14 is put over first end 12a. As a result, burrs to be formed on the end of opening of cap 14 by the foregoing bite can be reduced.

Lead-wire 11 thus invites fewer amounts of burrs, so that when lead-wire 11 is inserted into through-hole 18a, it can be prevented that such burrs attach to capacitor element 16. As a result, a short circuit due to the burrs can be prevented. It is also prevented that sealing member 18 is scratched in through-hole 18a by such burrs. The air-tightness of the sealing can be thus increased, and the reliability of the electronic component can be improved.

First end 12a of electrode 12 led out of lead-wire 11 is bonded to cap 14 by mechanical press-fitting, and metal diffused layer 12d is formed by melting on the interface between first end 12c and cap 14. This structure increases the bonding strength, so that the bonding reliability is increased. The electronic component using lead-wire 11 thus incurs a smaller number of open-failures caused by a break in lead-wire 11 even if severe vibrations are loaded on the component.

The melting point of the base material of cap 14 is preferably higher than that of led-out electrode 12. For instance, in a case where electrode 12 made of aluminum is used, cap 14 is preferably made of metal having a melting point higher than that of aluminum. This structure allows preventing cap 14 from excessively melting during the heat application in step C, thereby preventing malformation such as burrs or projections on the outer face of cap 14 from being produced.

In a case where led-out electrode 12 is made of aluminum, the base material of cap 14 is preferably selected from copper, nickel, iron, or an alloy containing copper, nickel, or iron. These metals can produce an alloy in liquid phase status at the temperature not higher than the melting point of aluminum. This structure allows forming metal diffused layer 12d with ease on the interface formed between first end 12c of led-out electrode 12 made of aluminum round bar and cap 14 during the heat application after press-fitted, so that the bonding strength can be increased. It is preferable that the metal having a melting point higher than that of aluminum is provided inside cap 14 in order to encourage the formation of metal diffused layer 12d. Such a metal can be used as the base material or the plated-layer of cap 14.

The electronic component using lead-wire 11 thus incurs a smaller number of open-failures caused by a break in lead-wire 11 even if severe vibrations are loaded on the component. The foregoing structure also allows preventing a short circuit or degradation in air-tightness of the sealing although these failures are caused by burrs or projections formed on the outer face of cap 14.

When cap 14 and led-out electrode 12 are bonded together by heating the interface formed by press-fitting, it is preferable to take the thickness and material of cap 14 as well as the covered range of led-out electrode 12 into consideration. Adjustments of these factors allow reducing the malformation caused by over-melting cap 14 while the bonding strength can be increased. The outer bottom and the outer wall of cap 14 to which heat is to be applied preferably have a uniform thickness in order to uniformly melt the interface where cap 14 is press-fitted with first end 12c.

In a case where cap 14 is plated with tin on the surface and led-out electrode 12 is made of aluminum round bar, aluminum and tin are diffused in metal diffused layer 12d. When this diffused state is left in an environment where a heat cycle or a condition of high temperature and high humidity is loaded on the diffused state, the diffused state generally tends to produce tin-whisker. If the diffusing section of aluminum and tin is exposed from the outer face of the electronic component, growth of the tin-whisker sometimes incurs a short circuit. However, in lead-wire 11, metal diffused layer 12d is housed in cap 14, so that metal diffused layer 12d is not exposed outside. Even if metal diffused layer 12d contains aluminum and tin, the tin-whisker does not grow outside. As a result, the electronic component using lead-wire 11 can prevent a short circuit caused by the tin-whisker from occurring. In a case where a combination of metals other than aluminum and tin exists in metal diffused layer 12d, and if the combination of the metals tends to produce whisker, the same advantage as discussed above is obtainable.

The outer diameter of cap 14 is greater than that of led-out electrode 12 in lead-wire 11, so that lead-wire 11 has a step (not shown). The presence of the step allows lead-wire 11 extending through hole 18a of sealing member 18 to be engaged with sealing member 18 more strongly. As a result, lead-wire 11 can be prevented from shifting toward inside of housing 17, so that load on the joint between lead-wire 11 and capacitor element 16 can be avoided. Therefore, the electronic component using lead-wire 11 can avoid a break in the wire, a short circuit, and increment in leakage current caused by an abnormality at the junction between lead-wire 11 and capacitor element 16.

The diameter of through-hole 18a formed on sealing member 18 is preferably set somewhat greater in advance only at the place, where cap 14 provided to lead-wire 11 is to be located, than the other parts of hole 18a. This preparation allows narrowing the gap between lead-wire 11 and through-hole 18a, so that the air-tightness of the sealing can be improved, where the gap is produced by the difference in outer diameters between cap 14 and led-out electrode 12.

It is preferable that cap 14 has a flaring curve on the entire or parts of its outer wall, and the curve flares from the outer bottom face toward the opening of cap 14. Cap 14 preferably has the foregoing curve at least on its outer wall that touches the inner wall of through-hole 18a when lead-wire 11 is inserted into through-hole 18a. For instance, the curve may be a domed shape, corned shape or a shape of truncated corn. The presence of the foregoing curve allows reducing load to be applied onto lead-wire 11 during the insertion of lead-wire 11 into through-hole 18a. Thanks to the curve, lead-wire 11 can be prevented from being deformed, and each one of the pair of lead-wires 11 can be prevented from running differently in timing from each other into through-hole 18a, so that the junction between lead-wire 11 and capacitor element 16 can be free from load. As a result, the electronic component using lead-wire 11 discussed above can avoid a break in the wire, a short circuit, and increment in leakage current caused by an abnormality at the junction between lead-wire 11 and capacitor element 16.

In a case where terminal 15 of lead-wire 11 is made of iron-based material, cap 14 is preferably made of iron, nickel, or iron-nickel based alloy. In a case where terminal 15 is made of copper-based material, cap 14 is preferably made of copper or copper-based alloy. In other words, reducing the difference in electric resistances between terminal 15 and cap 14 prevents malformation such as burrs from occurring when they are resistance-welded together while bonding strength between terminal 15 and cap 14 is maintained.

When the heat applied during the bonding between the outer face of cap 14 and terminal 15 travels to the interface between cap 14 and first end 12c, the heat may cause fusion on the interface. At that time, burrs or projections may be produced by this fusion. However, such burrs or projections cannot be exposed outside, because first end 12c is covered with cap 14. The electronic component using lead-wire 11 discussed above thus can avoid a short circuit caused by the burrs to be produced during the insertion of lead-wire 11 into through-hole 18a, so that the air-tightness of the sealing and the reliability of the electronic component can be improved.

Terminal 15 is coupled to led-out electrode 12 via cap 14, so that the materials of terminal 15 and cap 14 can be selected from metals easy-to-weld to each other. For instance, in the case of using laser for bonding terminal 15 to cap 14, the material for terminal 15 is preferably selected such that it has a melting point or heat conductivity identical or similar to that of cap 14. This preparation allows stabilizing the bonding strength and preventing malformation caused by over-melting one of cap 14 and terminal 15 at the junction. The electronic component using lead-wire 11 thus can prevent terminal 15 from running off. The electronic component can also prevent a short circuit or a leakage of electrolytic solution caused by malformation such as burrs or projections formed at the junction between cap 14 and terminal 15.

Next, manufacturing steps preferably carried out prior to step A demonstrated in FIG. 3A are described hereinafter. FIGS. 4A and 4B show sectional views of lead-wire 11 in those preceding steps. As shown in FIG. 4A, it is preferable to add a step of forming flat chamfered section 22f on the outer brim of first end l2a of led-out electrode 12 (step F) prior to step A. Presence of step F makes the inner brim of the opening of cap 14 harder to touch the outer brim of first end 12a when cap 14 is put over first end 12a, so that the burrs can be further prevented from producing on the end of opening of cap 14.

Furthermore, in step A shown in FIG. 4B, it is preferable to form chamfered section 24a at the inner brim of the opening of cap 14. The presence of chambered section 24a allows the inner brim of the opening of cap 14 to make further harder to touch the outer brim of first end 12a of led-out electrode 12. As a result, the production of the burrs can be further reduced. The shape of chamfered sections 22f and 24a can be a curve, which produces an advantage similar to what a flat chamfered section produces.

As described above, in the electronic component using lead-wire 11, a short circuit caused by the burrs is prevented from occurring when lead-wire 11 is inserted into through-hole 18a, and the air-tightness of the sealing and the reliability of the electronic component are improved.

Second Embodiment

Figure 5:
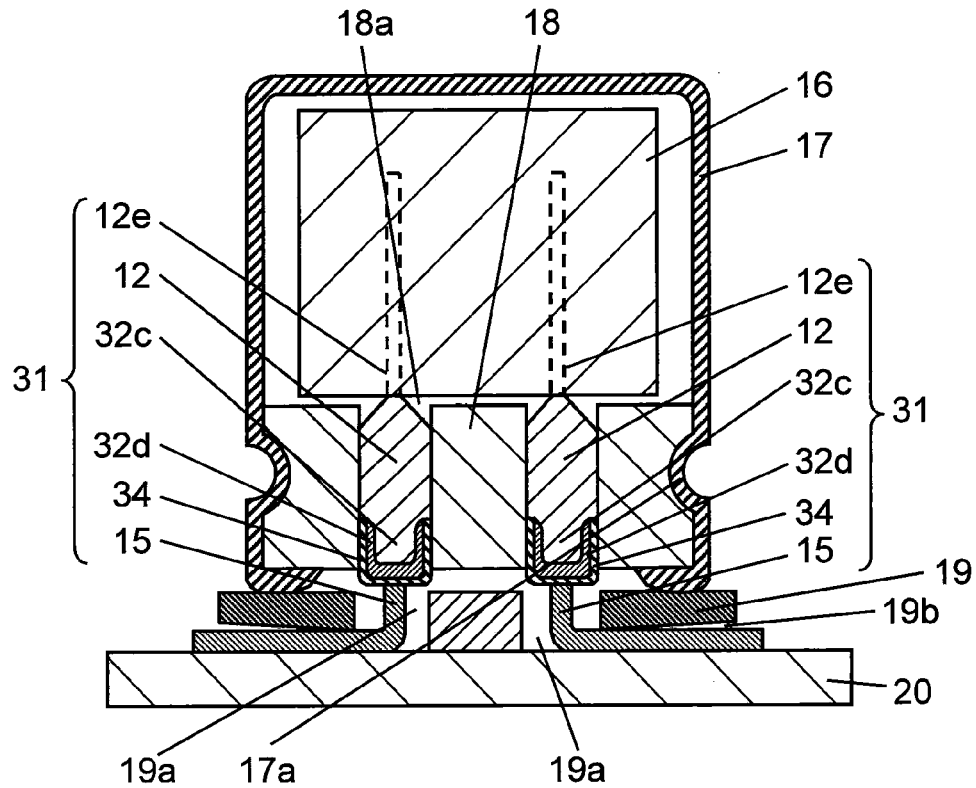
FIG. 5 is a sectional view of an aluminum electrolytic capacitor, which is an example of an electronic component in accordance with a second embodiment of the present invention.
Figure 6:
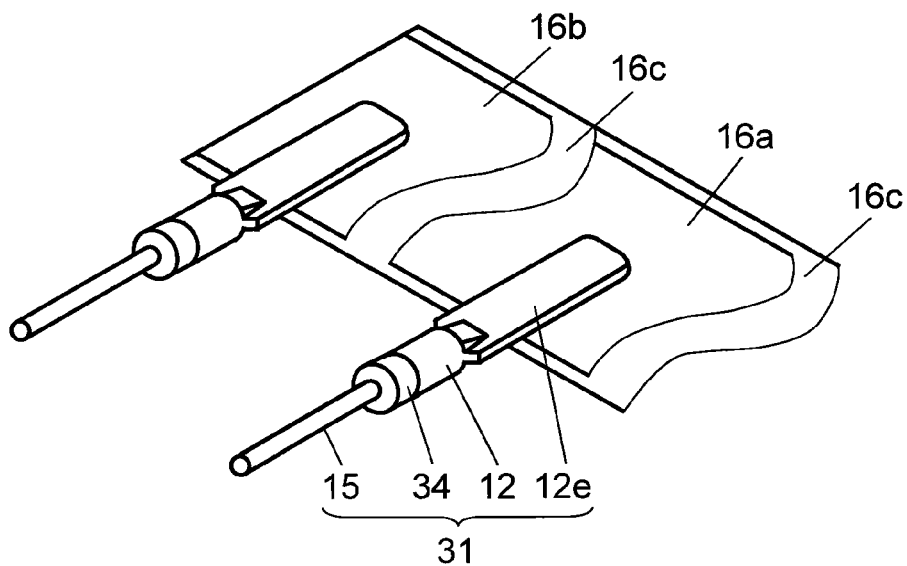
FIG. 6 is an exploded perspective view which is partially cut, illustrating a part of a capacitor element of the aluminum electrolytic capacitor shown in FIG. 5.

FIG. 5 is a sectional view of an aluminum electrolytic capacitor, which is an example of an electronic component in accordance with the second embodiment of the present invention. FIG. 6 is an exploded perspective view which is partially cut, illustrating a part of a capacitor element which works as a functional element of the aluminum electrolytic capacitor shown in FIG. 5. FIGS. 7A-7G show sectional views of the lead-wire, placed in respective manufacturing steps, to be used in the aluminum electrolytic capacitor shown in FIG. 5. First, the structures of the aluminum electrolytic capacitor and its lead-wire are described with reference to FIGS. 5 and 6.

In FIG. 5, the aluminum electrolytic capacitor differs from the one shown in FIG. 1 in the shape of first end 32c having undergone the deformation, of led-out electrode 12 of lead-wire 31. To be more specific, first end 32c is narrower than the main body of led-out electrode 12 and the difference in the outer diameters between cap 34 put over first end 32c and the main body of led-out electrode 12 is smaller than that of the aluminum electrolytic capacitor shown in FIG. 1.

A method for manufacturing lead-wire 31 discussed above in accordance with the second embodiment is demonstrated with reference to FIGS. 7A-7G. This method differs from the one shown in FIGS. 3A-3E in the presence of a step prior to step A shown in FIG. 7C, namely, in this preceding step (step G), first end 32a (before the deformation) of led-out electrode 12 is narrowed as shown in FIG. 7A. In step G, first end 32a is pressed with a tooling die into a shape narrower than the main body of led-out electrode 12, for example.

In step A following step G, cap 34 is put over first end 32a. In step B shown in FIG. 7D following step A, the outer bottom face of cap 34 is pressed mechanically until deformed first end 32c is brought into contact with and press-fitted to the inner face of cap 34. The dimensions to be processed of first end 32a are thus set such that the opening end of cap 34 does not touch the step, which is formed due to the difference in the outer diameters between the main body of electrode 12 and first end 32a, during the application of a press in step B.

Meanwhile, flat chamfered section 32f is preferably formed on the outer brim of first end 32a (step F) as shown in FIG. 7B in parallel with or just after step G. Flat chamfered section 32g is preferably formed on the outer brim of the step produced due to the difference in the outer diameters between the main body of led-out electrode 12 and first end 32a (step H).

FIGS. 7E-7G illustrate the steps similar to steps C, D and E described in the first embodiment and demonstrated in FIGS. 3C-3E, so that the descriptions of the steps shown in FIGS. 7E-7G are omitted here. Lead-wire 31 can be thus manufactured through the steps G, F, H, A, B, C, D and E. The method for manufacturing the aluminum electrolytic capacitor using lead-wire 31 is similar to the method demonstrated in the first embodiment.

As discussed above, first end 32a of led-out electrode 12 of lead-wire 31 in accordance with the present embodiment is processed to be narrower than the main body of electrode 12. This structure allows reducing the difference in the outer diameters between cap 34 which is put over end 32a and press-fitted to led-out electrode 12, and the main body of led-out electrode 12. As a result, a short circuit caused by the burrs to be produced when lead-wire 31 is inserted into through-hole 18a of sealing member 18, can be prevented from occurring. In the case that the thickness of sealing member 18 is thin, a gap between through-hole 18a and lead-wire 31 can be prevented from occurring. The air-tightness of the sealing can be thus improved.

Use of lead-wire 31 thus manufactured through the steps discussed above including step H allows an edge of outer rim of the step produced due to the difference in the outer diameters between the main body of led-out electrode 12 and first end 32a, not to form in an acute angle. Therefore, sealing member 18 can be prevented from being scratched at the inside of through-hole 18a when lead-wire 31 is inserted into through-hole 18a. As a result, the electrolytic solution can be prevented from leaking, and the air-tightness of the sealing can be improved. Step H can be carried out in parallel with or just after step G, or at the same time as or before or after step F.

As shown in FIG. 7C, chamfered section 34a is preferably formed on the inner brim of the opening of cap 34. This structure makes the inner brim of the opening of cap 34 further harder to touch the outer brim of first end 32a, and the burrs can be prevented from being formed on the end of the opening of cap 34.

Chamfered sections 32f, 32g, and 34a shown in FIGS. 7B and 7C can have curved shapes in stead of flat shapes. The curved chamfered sections can produce an advantage similar to what the flat chamfered section produces.

Next, another step G is described with reference to FIGS. 8A and 8B, which show sectional views of lead-wire 31 placed in other manufacturing steps.

In step G shown in FIG. 8A, undeformed first end 42a of led-out electrode 12 is processed into a shape of truncated corn, i.e. a trapezoid in sectional view. To be more specific, an outer diameter of the tip of first end 42a is processed into a smaller one. This tip shaped like the truncated corn makes the inner rim of the opening of cap 34 further harder to touch the outer brim of first end 42a when cap 34 is put over first end 42a so as to prevent the burrs from being formed on the end of the opening of cap 34 more effectively.

The advantages of the present embodiment are described by using specific instances. First, the aluminum round bar having 1.3 mm diameter and 99.99% purity is used as the material for the main body of led-out electrode 12.

Cap 34 is formed by pressing an iron sheet, and the dimensions of its opening are set as followings: the outer diameter is 1.6 mm, the inner diameter is 1.3 mm, and the length is 0.8-1.0 mm. The bottom of cap 34 is curved at the outer rim and has a flat circular section having a diameter ranging from 0.3 mm to 1.0 mm. The surface of cap 34 includes a nickel-plated layer containing copper as a primary coat, and the nickel-plated layer has a thickness ranging from 2 μm to 10 μm. Flat chamfered section 34a is provided to an inner brim of the end of opening of cap 34.

Terminal 15 is made of iron-wire of which outer diameter is 0.6 mm, and a nickel-plated layer, containing copper as a primary coat and having a thickness ranging from 2 μm to 10 μm, is formed on the surface of terminal 15.

In step G shown in FIG. 7A, first end 32a of led-out electrode 12 is pressed with the tooling die so that end 32a can be shaped narrower than the main body of electrode 12 and the inner diameter of cap 34, namely, the outer diameter of end 32a is processed to be 1.10 mm. The length of end 32a along the axial direction of electrode 12 is processed to be 1.3 mm which is longer than the length of cap 34.

Step F shown in FIG. 7B is carried out simultaneously with step G: flat chamfered section 32f is formed on the outer brim of first end 32a with a tooling die. On top of that, in step H, flat chamfered section 32g is formed on the outer brim of the step produced due to the difference in the outer diameters between the main body of led-out electrode 12 and first end 32a.

Next, in step A shown in FIG. 7C, the main body of electrode 12 is held by chucking jig 13a at the outer surface such that first end 32a is exposed, and then end 32a is covered with cap 34 so that the inner bottom of cap 34 touches the end face of first end 32a.

Then in step B shown in FIG. 7D, the outer bottom of cap 34 is mechanically pressed until first end 32a is deformed inside cap 34 to have a greater outer diameter and the outer face of deformed first end 32c of lead-wire 12 is brought into contact with the inner face of cap 34 and press-fitted together.

Next, in step C shown in FIG. 7E, welding electrodes 13b are connected respectively to the outer bottom of cap 34 and the main body of led-out electrode 12, and then cap 34 and first end 32c are heated by the resistance-welding method. At that time, the temperature rises around the melting point of the metals used as materials for cap 34 and electrode 12, so that the interface formed by press-fitting between cap 34 and electrode 12 is melted. Metal diffused layer 32d containing the metals used as the materials for cap 34 and electrode 12 is thus formed in the interface.

Then in step D shown in FIG. 7, wire-shaped terminal 15 is urged against the outer face of cap 34, and welding electrodes 13c are coupled to terminal 15 as well as the main body of electrode 12 respectively, whereby terminal 15 is bonded to electrode 12 with the resistance-welding method.

Next, in step E shown in FIG. 7G, second end 12b of led-out electrode 12 is pressed at the outer side face so that second end 12b is shaped into a plate in parallel with an axial direction of electrode 12, then this plate is trimmed at the periphery into flat section 12e. Lead-wire 31 is thus manufactured through steps G, F, H, A, B, C, D, and E.

A comparative sample lead-wire is produced in order to compare foregoing lead-wire 31 and an aluminum electrolytic capacitor using lead-wire 31 with this comparative sample lead-wire and another capacitor using the comparative sample lead-wire. The comparative sample lead-wire is produced in the following way: it is formed of led-out electrode 12, cap 34, and terminal 15 same as those of lead-wire 31. In step G shown in FIG. 7A, when first end 32a of electrode 12 is narrowed, its outer diameter is set at 1.4 mm slightly greater than the inner diameter of cap 34. This structure requires a mechanical press onto the outer bottom face of cap 34 when cap 34 is put over first end 32a so that the inner bottom face of cap 34 touches the end face of first end 32a. As a result, the cylindrical face of first end 32a is press-fitted to the inner face of cap 34 in step A, so that step B can be omitted. The other steps are carried out in the same way as lead-wire 31 is manufactured. The comparative sample lead-wire is produced through steps G, F, H, A, C, D, and E.

The aluminum electrolytic capacitor using lead-wire 31 and another aluminum electrolytic capacitor using this comparative sample lead-wire are produced. The process of the production of the capacitor using lead-wire 31 is demonstrated hereinafter as an example with reference to FIGS. 5 and 6. First, an aluminum foil is processed with an etching process, and then the foil is processed with chemical oxidation in aqueous solution of ammonium borate, thereby forming an oxide film on the aluminum foil. Anode foil 16a is thus produced. On the other hand, an aluminum foil is processed with an etching process, thereby forming cathode foil 16b.

Second, flat sections 12e of lead-wires 31 are press-fitted to anode foil 16a or cathode foil 16b, respectively. Then, separator 16c made of manila-paper is placed between anode foil 16a and cathode foil 16b, and these members are wound up to form capacitor element 16.

Next, capacitor element 16 is impregnate with electrolytic solution, and then accommodate element 16 into housing 17 made of aluminum and shaped like a cylinder having a bottom. After that, sealing member 18 chiefly made of butyl rubber is mounted to the opening of housing 17 while a pair of lead-wires 31 led out of capacitor element 16 is run into through-holes 18a formed in sealing member 18. As a result, terminals 15 are led outside sealing member 18.

Next, housing 17 and sealing member 18 is together processed with a drawing process at the outer wall of housing 17 for sealing the end of the opening of housing 17. Then insulating terminal board 19 is brought into contact with the opening of housing 17, and terminals 15 exposed outside sealing member 18 are inserted into through-holes 19a formed in board 19. Finally, terminals 15 are bent at approx. right angles and accommodated into groove 19b formed on the surface of board 19. A surface-mounted type aluminum electrolytic capacitor rated at 6.3V and 1500 μF is thus produced through the steps discussed above.

One thousand pieces of lead-wire 31 and the comparative sample lead-wire are manufactured, respectively. Then, appearance defects caused by burrs produced on the end of opening of cap 34 joined to led-out electrode 12 are investigated, and defects in a test of tensile strength between electrode 12 and cap 34 are investigated for the pieces.

The investigation of appearance defects results in no defects of lead-wires 31, however, 200 appearance defects are found in the comparative sample lead-wires. The investigation of tensile strength results in no defects both in lead-wires 31 and the comparative sample lead-wires. The results prove that lead-wire 31 can maintain the bonding strength between electrode 12 and cap 34 while it can reduce the burrs produced on the end of opening of cap 34 comparing with the comparative sample lead-wire.

One thousand pieces of the aluminum electrolytic capacitor using lead-wire 31 and another aluminum electrolytic capacitor using the comparative sample lead-wire are manufactured, respectively, and then defects caused by shorts in a reflow test are investigated.

The investigation results in no defects in the capacitors which use lead-wires 31, however, five defects are found in the other capacitors which use the comparative sample lead-wires. The investigation proves that use of lead-wire 31 allows preventing defects caused by a short circuit after the reflow, and the reliability of the aluminum electrolytic capacitor can be improved.

Third Embodiment

Figure 9:
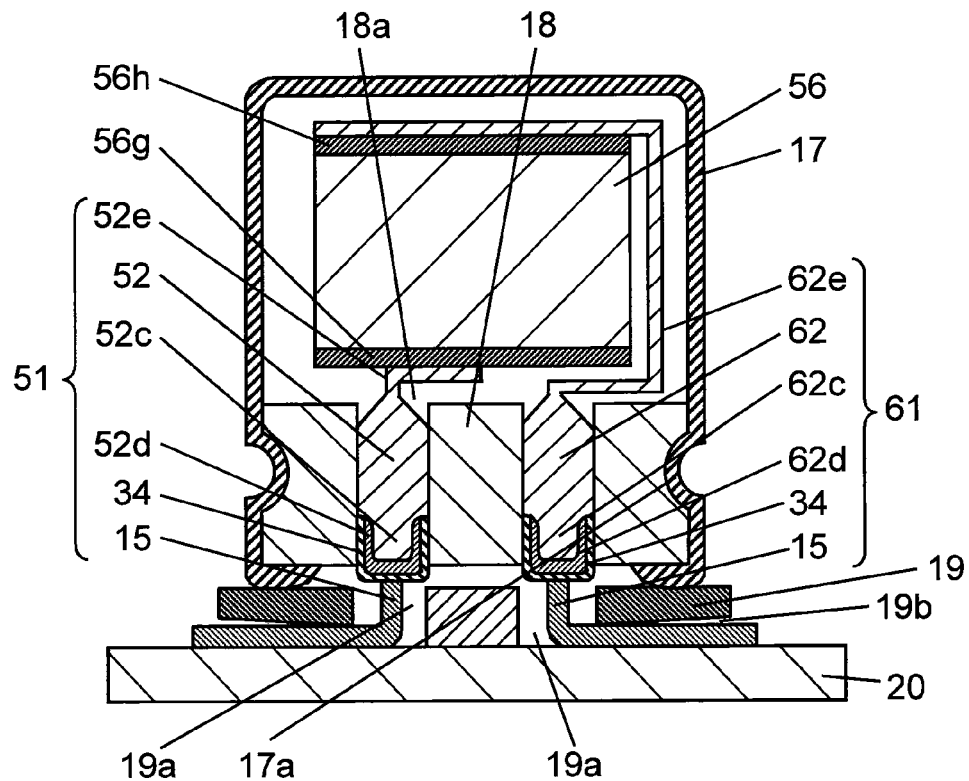
FIG. 9 is a sectional view of a film capacitor, which is an example of an electronic component in accordance with a third embodiment of the present invention.
Figure 10:
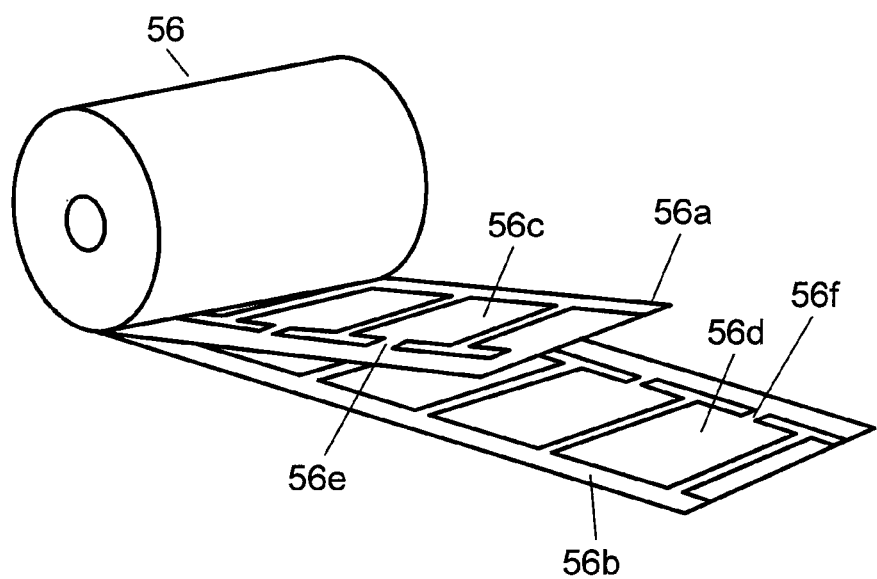
FIG. 10 is an exploded perspective view of a capacitor element of the film capacitor shown in FIG. 9.

FIG. 9 is a sectional view of a film capacitor, which is an example of an electronic component in accordance with the third embodiment of the present invention. FIG. 10 is an exploded perspective view of a capacitor element which works as a functional element of the film capacitor. FIG. 11A-FIG. 11G are sectional views of lead-wires, placed in respective manufacturing steps, to be used in the film capacitor. First, the structures of the film capacitor and the lead-wire to be used in the film capacitor are described with reference to FIGS. 9 and 10.

The film capacitor shown in FIG. 9 differs from the aluminum electrolytic capacitor shown in FIG. 5 of the second embodiment in the following points: Capacitor element 56 formed of metalized film is used as a functional element, and respective flat sections 52e and 62e of lead-wires 51 and 61 are bent and their tips are connected respectively to collectors 56g and 56h formed on the end-faces of capacitor element 56.

As shown in FIG. 9, the film capacitor has capacitor element 56, housing 17, sealing member 18, and insulating terminal board 19. Capacitor element 56 is formed by winding up a pair of metalized films into a cylindrical shape, and includes collectors 56g, 56h at both of the end-faces. Lead-wires 51, 61 are connected to collectors 56g and 56h, respectively. To be more specific, flat sections 52e and 62e of lead wires 51 and 61 are bent, and the tips of the flat sections are bonded to collectors 56g and 56h, respectively. Led-out electrodes 52 and 62 are led out in pairs to a first end-face side of capacitor element 56.

Cylindrical housing 17 having a bottom is made of aluminum or aluminum alloy and accommodates capacitor element 56 therein. A space is provided between the outer surface of capacitor element 56 and the inner surface of housing 17 in order to avoid a touch between them.

Sealing member 18 seals an opening of housing 17 and is provided with a pair of through-holes 18a through which lead-wires 51 and 61 are inserted. Insulating terminal board 19 is placed such that it touches the opening of housing 17, and is provided with through-hole 19a through which a pair of terminals 15 led outside from through-holes 18a are inserted. Terminal board 19 is provided with grooves 19b at its outer surface for accommodating terminals 19 run through hole 19a and bent at approx. right angles. Terminals 15 accommodated in grooves 19b are connected to circuit board 20.

As shown in FIG. 10, a pair of metalized films forming capacitor element 56 respectively include a dielectric film, deposited electrode 56c, 56d formed by depositing a metal such as aluminum on the surface of the dielectric film, and fuse 56e, 56f. Non-deposited sections 56a, 56b are respectively formed on an end of each dielectric film in the width direction. The dielectric film is formed of one of polyethylene-terephthalate, polypropylene, polyethylene-naphthalate, or polyphenylene-sulfide and the like. Fuses 56e, 56f have self-preservation function such as the deposited sections are blown out and electrically cut when an abnormal current runs. The pair of metalized films discussed above is wound up into a cylindrical shape such that deposited electrodes 56c and 56d do not touch each other, whereby capacitor element 56 is formed. As shown in FIG. 9, a pair of collectors 56g and 56h are formed on end faces of capacitor element 56, respectively, and connected to deposited electrodes 56c and 56d, respectively.

A pair of metalized film can be layered to form a laminated capacitor element instead of the structure discussed above.

A method for manufacturing lead-wires 51, 61 is demonstrated hereinafter with reference to FIGS. 11A-11G.

The manufacturing method shown in FIGS. 11A-11G differs from the method shown in FIGS. 7A-7G of the second embodiment in the following point: both of the ends of a single piece of led-out electrode 12 are processed and then cut to form a pair of lead-wires 51 and 61. To be more specific, in steps G, F, H shown in FIG. 11A, both of the ends of led-out electrode 12 are processed to form first ends 52a and 62a, not deformed yet but having a shape narrower than the main body of electrode 12. Then, chamfered sections 52g, 52f, 62g and 62f are formed by processing each one of the tips and the steps. After that, in step A shown in FIG. 11B, caps 34 is put over first ends 52 and 62a, respectively, and then in step B shown in FIG. 11C, caps 34 are pressed against led-out electrode 12 to form first ends 52c and 62c, so that caps 34 are press-fitted to electrode 12. Furthermore, in step C shown in FIG. 11D, metal diffused layers 52d and 62d are formed, and in step D shown in FIG. 11E, each terminal 15 is connect to each cap 34.

After step D shown in FIG. 11E, namely, in step I shown in FIG. 11F, led-out electrode 12 is cut vertically with respect to the axial direction into two parts. In step I, led-out electrode 12 is cut with cutter 33d at approx. the center. In a case where flat sections 52e and 62e of lead-wires 51 and 61 differ in length from each other as shown in FIG. 9, the cutting point can be adjusted according to the ratio of the lengths. Finally in step E shown in FIG. 11G, flat sections 52e and 62e are formed. Lead-wires 51 and 61 are thus manufactured through steps G, F, H, A, B, C, D, I and E discussed above.

Step I can be carried out after step B or step C. Step E can be carried out before step I.

A manufacturing method for a film capacitor using lead-wires 51 and 61, as an example of the electronic components in accordance with the present embodiment is demonstrated hereinafter.

The method differs from the one shown in FIG. 9 of the second embodiment in the following points: capacitor element 56 is produced in a different way, and the film capacitor needs no electrolyte such as an electrolytic solution. The other steps remain the same as those described in the second embodiment.

First, a method for manufacturing capacitor element 56 is demonstrated. As shown in FIG. 10, deposited electrodes 56c and 56d are formed respectively on each first face of a pair of dielectric films of which widths are cut to a given width while non-deposited sections 56a and 56b are left on each end of the films along the longitudinal direction.

Then the films are laminated with each other such that deposited electrodes 56c and 56d do not touch each other and non-deposited sections 56a and 56b confront each other. The metalized films are then wound to make a cylindrical shape to form a rolled unit. Deposited electrodes 56c and 56d are exposed from the end faces of the rolled unit.

Next, the melted metal such as aluminum, tin, or copper is sprayed onto both the end faces of the pair of metalized films wound into the cylindrical shape, thereby forming collectors 56g and 56h, which are then connected to deposited electrodes 56c and 56d, respectively.

Then, flat sections 52e and 62e of lead-wires 51 and 61 are bent, and the tips of the bent flat sections are connected to collectors 56g and 56h by spot-welding, respectively. Led-out electrodes 52 and 62 are led out in pairs out of the rolled unit along the same direction, whereby capacitor element 56 is formed.

Next, capacitor element 56 is accommodated into housing 17. At this time, a space is provide between element 56 and housing 17, or housing 17 is provided with an insulating member at the inner surface. One of these preparations prevents the outer surface of element 56 from touching the inner surface of housing 17.

Next, the opening of housing 17 is sealed with sealing member 18 with the same method as the one carried out in the second embodiment to be ready for surface mounting.

As discussed above, capacitor element 56 formed of the metalized films, from which end-faces deposited electrodes 56c and 56d are exposed, can use lead-wires 51 and 61. In other words, flat sections 52e and 62e are bent and connected to element 56, thereby forming the film capacitor. Use of lead-wires 51 and 61 allows reducing the burrs due to the bites by lead-wires 51 and 61 when they are run into through-holes 18a of sealing member 18, so that a short circuit caused by the burrs can be reduced as same as the second embodiment. The air-tightness of sealing the film capacitor can be also improved.

The method for manufacturing the lead-wires in accordance with the present embodiment can manufacture two lead-wires 51 and 61 from a single piece of led-out electrode 12 in an efficient manner, so that the productivity is increased.

Fourth Embodiment

Figure 12:
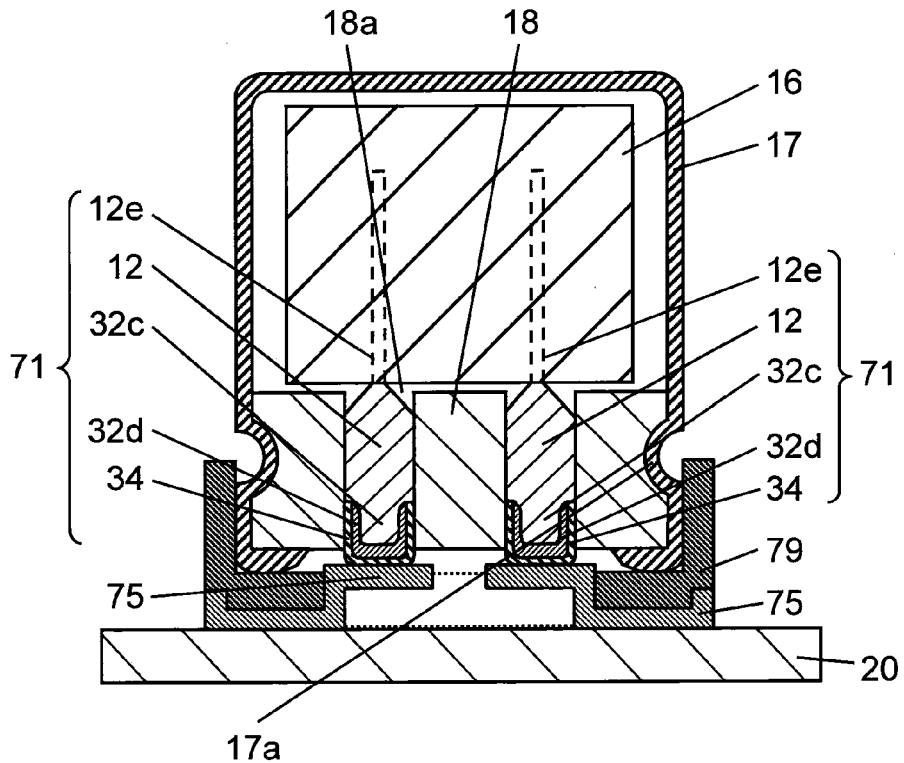
FIG. 12 is a sectional view of an aluminum electrolytic capacitor, which is an example of an electronic component in accordance with a fourth embodiment of the present invention.
Figure 13:
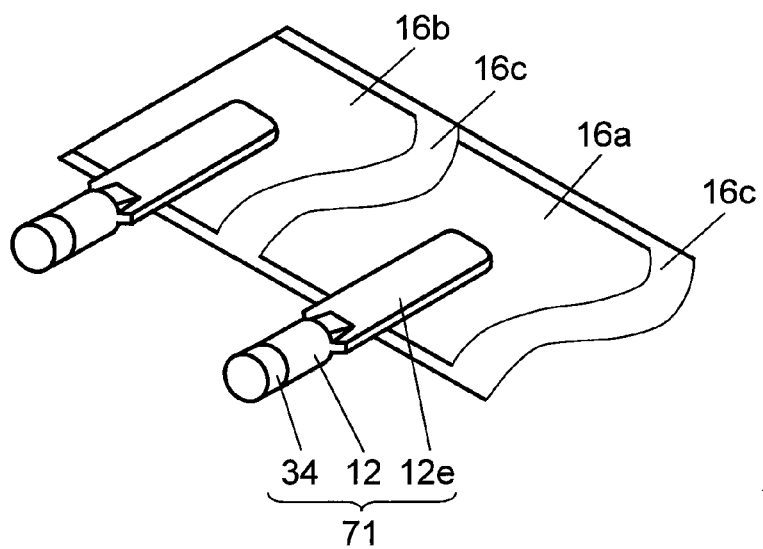
FIG. 13 is an exploded perspective view which is partially cut, illustrating a part of a capacitor element of the aluminum electrolytic capacitor shown in FIG. 12.

FIG. 12 is a sectional view of an aluminum electrolytic capacitor, which is an example of an electronic component in accordance with the fourth embodiment of the present invention. FIG. 13 shows an exploded perspective view which is partially cut, illustrating a capacitor element working as a functional element of the aluminum electrolytic capacitor.

First, the structures of the aluminum electrolytic capacitor and the lead-wire to be used in this capacitor are described with reference to FIGS. 12 and 13. The capacitor shown in FIG. 12 differs from the aluminum electrolytic capacitor shown in FIG. 5 of the second embodiment in lead-wire 71 having no terminal 75 in advance. To be more specific, terminal 75 is insert-molded with electrically-insulating terminal board 79 placed such that board 79 touches and fronts the opening of housing 17, and terminal 75 is connected to cap 34 of lead-wire 71.

This aluminum electrolytic capacitor is formed of capacitor element 16, housing 17, sealing member 18, and insulating terminal board 79. A pair of lead-wires 71 is connected to capacitor element 16, and each one of lead-wires 71 includes led-out electrode 12 and cap 34, which is connected to first end 32c of led-out electrode 12. A second end of led-out electrode 12 is processed into flat section 12e. A structure of lead-wire 71 is thus similar to the structure of lead-wire 31 in accordance with the second embodiment but it does not have terminal 15. Insulating terminal board 79 includes a pair of terminals 75 and is placed such that it touches and fronts the opening of housing 17. The outer bottom of cap 34 of lead-wire 71 is exposed outside of through-hole 18a of sealing member 18. A pair of caps 34 is bonded respectively to the pair of terminals 75 provided to insulating terminal board 79 at the outer bottom. Terminals 75 are connected to circuit board 20.

Lead-wire 71 can be manufactured in a similar way to lead-wire 31 in accordance with the second embodiment except that step D shown in FIG. 7F, in which terminal 15 is connected to lead-wire 31, is not conducted for lead-wire 71.

Next, a method for manufacturing the aluminum electrolytic capacitor using lead-wires 71 is demonstrated hereinafter. First, as shown in FIG. 13, anode foil 16a, cathode foil 16b, and separator 16c are cut into given shapes having given lengths and widths. Flat sections 12e of lead-wires 71 are connected to anode foil 16a and cathode foil 16b by crimping or ultrasonic welding, respectively. Then, separator 16c is interposed between anode foil 16a and cathode foil 16b, and these elements are wound together into a cylindrical shape. The cylindrical shape is fixed with an electrically insulating tape (not shown) so that capacitor element 16 is formed.

Capacitor element 16 working as a functional element can be formed by laminating multiple pairs of anode foil 16a and cathode foil 16b instead of winding anode foil 16a and cathode foil 16b together, or can be formed of a sintered body instead of anode foil 16a and cathode foil 16b.

Next, as shown in FIG. 12, capacitor element 16 is accommodated in housing 17 together with the electrolytic solution containing electrolyte. Then, a pair of lead-wires 71 led out of capacitor element 16 are inserted into a pair of through-holes 18a formed in sealing member 18, respectively. In this state, sealing member 18 is placed at the opening of housing 17. The electrolytic solution can be replaced with solid electrolyte such as conductive polymer, e.g. polypyrrole or polythiophene, or the electrolytic solution can be used together with the solid electrolyte.

Then, housing 17 is drawn at the outer peripheral wall to form drawn section 17a, thereby sealing the opening of housing 17. At this time, the outer surface of cap 34 is exposed from through-hole 18a of sealing member 18.

Then, insulating terminal board 79 is placed 7 so as to touch the opening of housing 17. Each of first ends of a pair of terminals 75, which are provided to board 79 by insert-molding, is brought into contact with each of caps 34 at the outer surface exposed from through-holes 18a of sealing member 18, and they are connected to each other by welding or the like.

In the case of that capacitor element 16 employs solid electrolyte, such as conductive polymer, an electrically-insulating exterior resin such as epoxy resin can be used instead of using housing 17 and sealing member 18. In this case, capacitor element 16 is covered with the exterior resin, and the outer surface of cap 34 of each of lead-wires 11 is led out of the exterior resin.

After sealing the opening of housing 17, or after mounting the insulating terminal board 79, a voltage is applied across terminals 75 appropriately for re-anodizing the capacitor element.

In the structure discussed above, cap 34 put over first end 32c is well bonded to terminal 75, so that there is no need for cap 34 to be bonded in advance to terminal 75. Terminal 75 can be bonded to the outer surface of cap 34 after lead-wire 71 is run into through-hole 18a and the outer surface of cap 34 is exposed outside. This structure thus can prevent the burrs from occurring during the insertion of lead-wire 71 into through-hole 18a, so that the short circuit caused by the burrs can be reduced as same as in the second embodiment. Additionally, the variation in locations of terminals 75 caused by bending the terminals can be small since terminal 75 is formed in advance on insulating terminal board 79 by insert-molding. As a result, the aluminum electrolytic capacitor can be steadily mounted by soldering.

Fifth Embodiment

Figure 14:
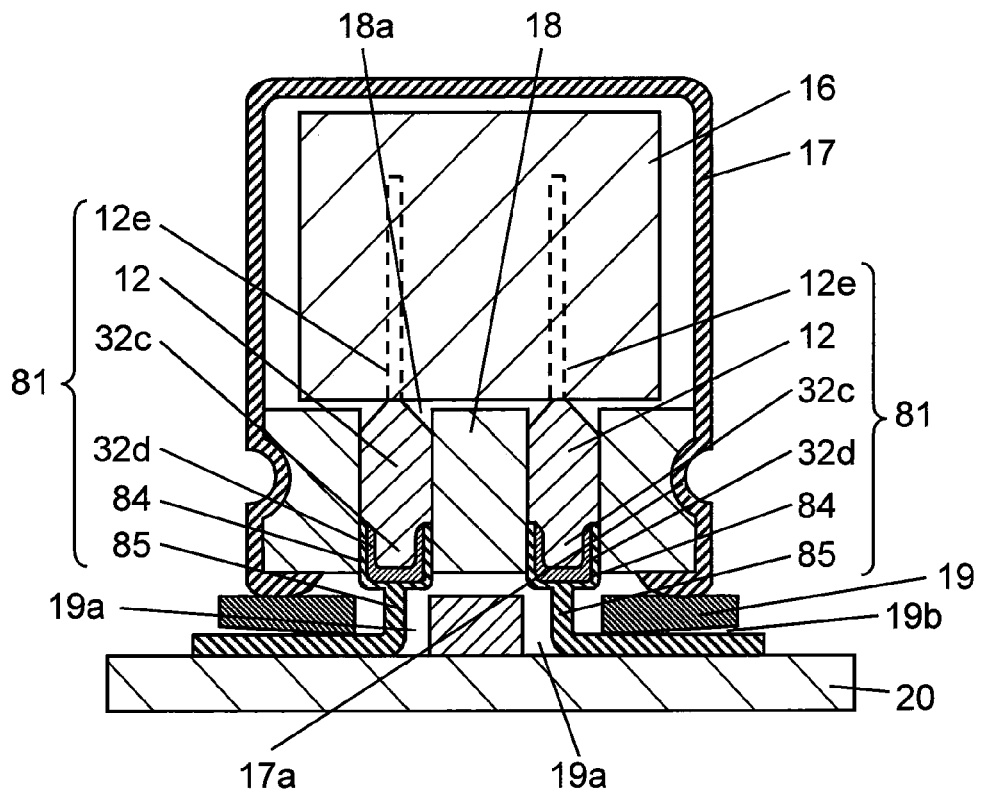
FIG. 14 is a sectional view of an aluminum electrolytic capacitor, which is an example of an electronic component in accordance with a fifth embodiment of the present invention.
Figure 15:
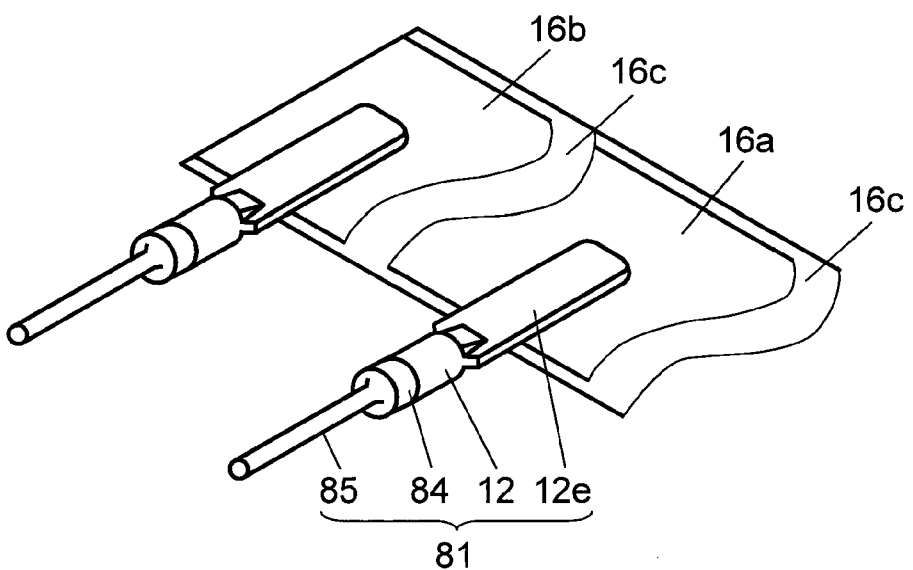
FIG. 15 is an exploded perspective view which is partially cut, illustrating a part of a capacitor element of the aluminum electrolytic capacitor shown in FIG. 14.

FIG. 14 is a sectional view of an aluminum electrolytic capacitor, which is an example of an electronic component in accordance with the fifth embodiment of the present invention. FIG. 15 is an exploded perspective view which is partially cut, illustrating a capacitor element working as a functional element of the aluminum electrolytic capacitor shown in FIG. 14. FIG. 16A-FIG. 16F are sectional views of a lead-wire, placed in respective manufacturing steps, to be used in the aluminum electrolytic capacitor.

First, the structures of the aluminum electrolytic capacitor and the lead-wire to be used in this capacitor are described with reference to FIGS. 14 and 15. The capacitor shown in FIG. 14 differs from the aluminum electrolytic capacitor shown in FIG. 5 of the second embodiment in using lead-wire 81 instead of lead-wire 31. Terminal 85 of lead-wire 81 is not welded to the outer surface of cap 84, but it is formed in one body together with cap 84.

Next, a method for manufacturing the lead-wire to be used in the aluminum electrolytic capacitor as an example of the electronic component in accordance with the fifth embodiment is demonstrated hereinafter with reference to FIGS. 16A-16F.

Figure 16:
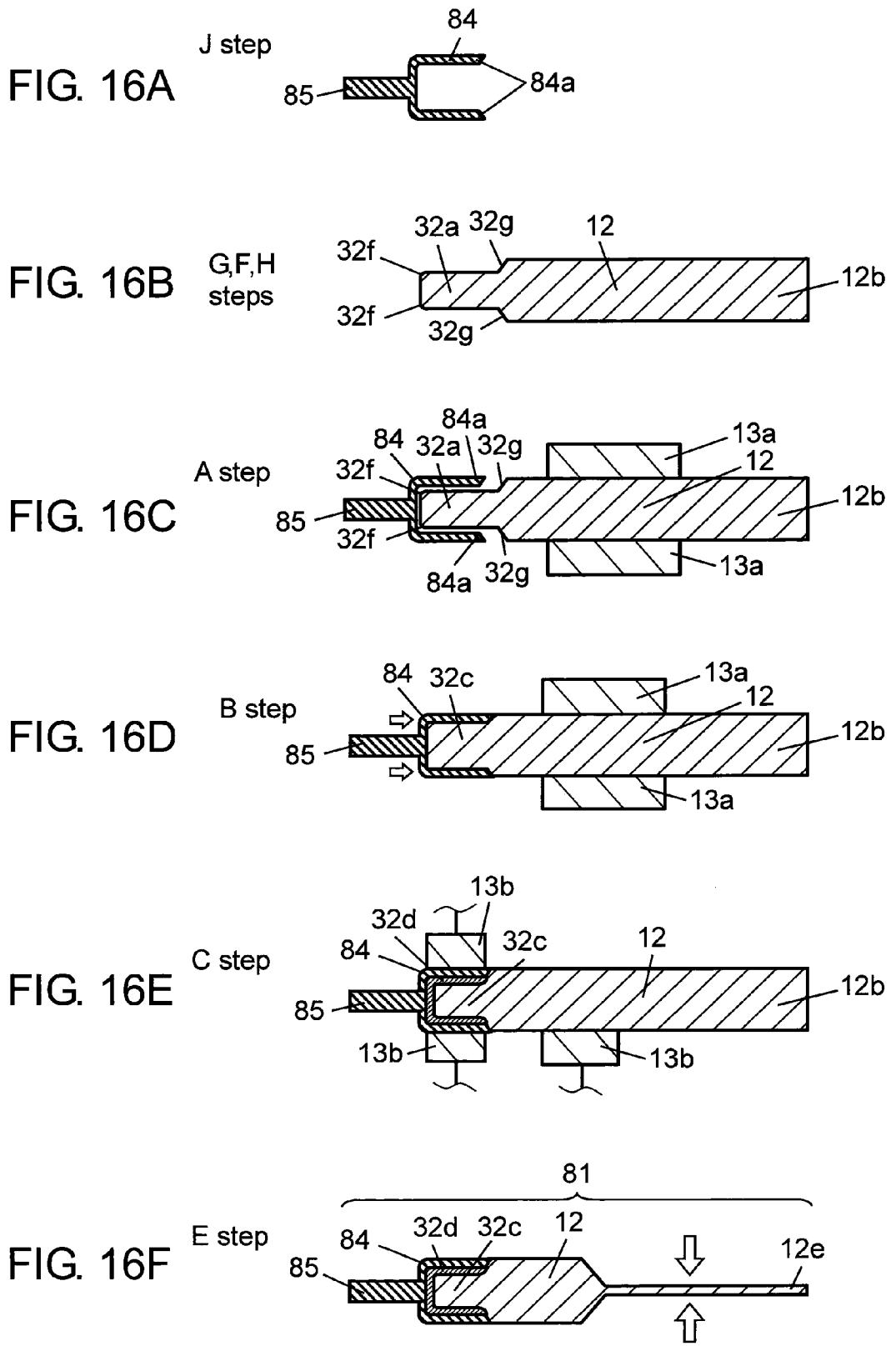
FIG. 16A is a sectional view of one of manufacturing steps of a lead-wire to be used in the aluminum electrolytic capacitor shown in FIG. 14.
FIG. 16B is a sectional view of a step following the step shown in FIG. 16A for manufacturing the lead wire.
FIG. 16C is a sectional view of a step following the step shown in FIG. 16B for manufacturing the lead wire.
FIG. 16D is a sectional view of a step following the step shown in FIG. 16C for manufacturing the lead wire.
FIG. 16E is a sectional view of a step following the step shown in FIG. 16D for manufacturing the lead wire.
FIG. 16F is a sectional view of a step following the step shown in FIG. 16E for manufacturing the lead wire.
Figure 17:
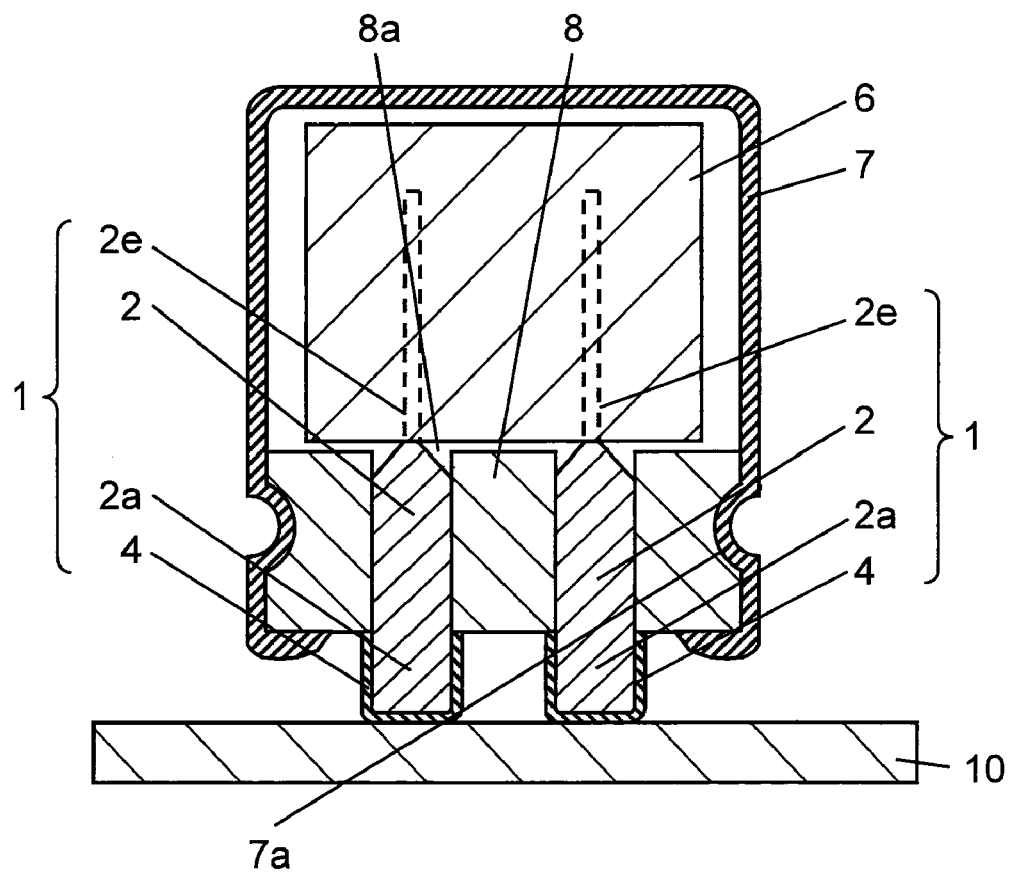
FIG. 17 is a sectional view of a conventional aluminum electrolytic capacitor.
Figure 18:
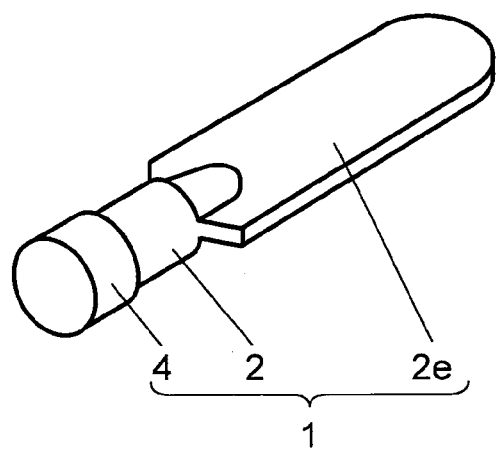
FIG. 18 is a perspective view of a lead-wire to be used in the aluminum electrolytic capacitor shown in FIG. 17.
Figure 19:
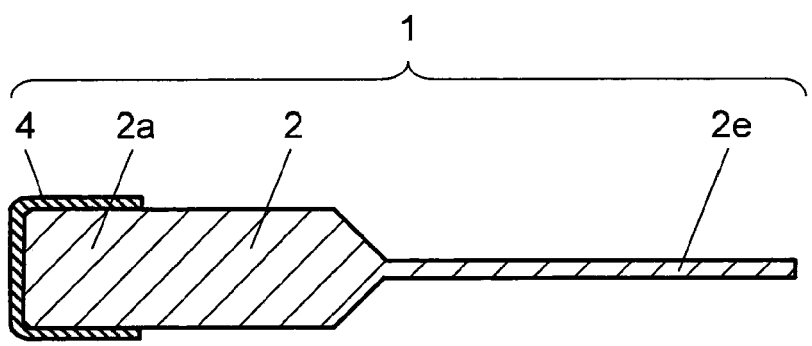
FIG. 19 is a sectional view of the lead-wire shown in FIG. 18.

The manufacturing steps shown in FIGS. 16A-16F differ from the ones shown in FIGS. 7A-7G in the following two points: Cap 84 is produced so as to be formed in one body together with terminal 85, which is formed on the outer surface of cap 84 as shown in FIG. 16A (step J), and step J is carried out in parallel with, or before or after steps G, F, and H shown in FIG. 16B. Step D for connecting cap 84 to terminal 85 by welding is eliminated.

In step J, a block-shaped base material such as iron is pressed to form terminal 85 on cap 84 so as to form them into one unit. At this time, chamfered section 84a is preferably formed on the end of the opening of cap 84.

Lead-wire 81 to be used in the aluminum electrolytic capacitor, which is an example of the electronic component in accordance with the fifth embodiment, is produced by using cap 84 through manufacturing steps G, F, H, A, B, C, and E. FIGS. 16C, 16D, 16E and 16F show steps A, B, C, and E, respectively.

In step B shown in FIG. 16D, first end 32a of led-out electrode 12 is deformed to form first end 32c, and the outer face thereof and the inner face of cap 84 are press-fitted together. At this time, a pressure is mechanically applied onto the outer bottom face of cap 84 such that the pressure is not applied to terminal 85.

In step C shown in FIG. 16E, cap 84 and led-out electrode 12 are heat-treated. During the heat treatment, welding electrode 13b is preferably connected to the outer surface of cap 84 except the location of terminal 85. This preparation allows efficiently forming metal diffused layer 32d.

Next, lead-wires 81 instead of lead-wires 31 are used for producing the aluminum electrolytic capacitor in a similar way to the second embodiment.

As discussed above, since terminal 85 is formed together with cap 84 in one body on the outer surface of cap 84, the step for welding terminal 85 to cap 84 can be omitted for improving the productivity. Variations in shapes and strength at the junction between terminal 85 and cap 84 are thus extremely small, so that the quality in connection is improved.

Since the shape at the junction between terminal 85 and cap 84, which are formed together in one body, is stable, a gap between lead-wire 81 and through-hole 18a of sealing member 18 is prevented from occurring. As a result, the air-tightness of the sealing can be improved. On top of that, vibration proof properties of the electronic component can be improved against severe vibration load. The electronic component of high reliability can be thus manufactured.

INDUSTRIAL APPLICABILITY

As described above, according to the electronic component according to the present invention, appearance of the cap can be prevented from being deformed when a cap is put over a first end of a led-out electrode of an electronic component, because the cap is made of a material harder than that of the lead-wire.

After the cap is put over the first end of the led-out electrode, the cap is pressed at the outer bottom face, so that the end of the led-out electrode is deformed while the cap remains not-deformed. An outer face of the end of the led-out electrode can be thus press-fitted to an inner face of the cap. This structure proves that an inner brim of an end of the opening of the cap can avoid biting an outer brim of the first end of the led-out electrode. In other words, this structure allows reducing burrs to be produced on the end of the opening of the cap.

As a result, the foregoing structure allows reducing the burrs caused by the deformation in the appearance of the cap or caused by the bites on the first end of the led-out electrode by the end of the opening of the cap, so that degradation caused by the burrs in air-tightness of the sealing can be prevented and a short circuit caused by the burrs can be also prevented. The present invention can be thus applied to a highly reliable electronic component that needs strict air-tightness at the sealing and resistance to short circuits.

The invention claimed is:

1. An electronic component comprising: a functional element; a led-out electrode made of metal and led out of the functional element; a cap covering an end of the led-out electrode and made of metal harder than the metal of the led-out electrode; and a terminal welded to an outer surface of the cap, wherein the cap is press-fitted on the end of the led-out electrode, and wherein the end of the led-out electrode has an enlarged outer diameter by press-fitting the cap on the end of the led-out electrode.

2. The electronic component according to claim 1, wherein the metal of the cap has a melting point higher than that of the metal of the led-out electrode.

3. The electronic component according to claim 1, wherein the led-out electrode is made of aluminum and the cap is chiefly made of iron.

4. The electronic component according to claim 3, wherein the cap is made by plating at least one of nickel, copper, and tin on a surface of iron.

5. The electronic component according to claim 1, wherein the led-out electrode has a part having a shape of round bar where the end covered with the cap is provided.

6. The electronic component according to claim 1, wherein the led-out electrode is one of a first led-out electrode led out of a first side of the functional element and a second led-out electrode led out of the functional element from the first side,
the cap is one of a first cap covering an end of the first led-out electrode and a second cap covering an end of the second led-out electrode,
the terminal is one of a first terminal welded to an outer surface of the first cap and a second terminal welded to an outer surface of the second cap, and
the electronic component has the first and second led-out electrodes, the first and second caps, and the first and second terminals.

7. A lead-wire comprising: a led-out electrode made of metal; and a cap covering an end of the led-out electrode and made of metal harder than the metal of the led-out electrode; and a terminal welded to an outer surface of the cap, wherein the cap is press-fitted on the end of the led-out electrode, and wherein the end of the led-out electrode has an enlarged outer diameter by press-fitting the cap on the end of the led-out electrode.

8. The lead-wire according to claim 7,
wherein the metal of the cap has a melting point higher than that of the metal of the led-out electrode.

9. The lead-wire according to claim 7,
wherein the led-out electrode is made of aluminum and the cap is chiefly made of iron.

10. The lead-wire according to claim 9,
wherein the cap is made by plating at least one of nickel, copper, and tin on a surface of iron.

11. The lead-wire according to claim 7 further comprising a metal diffused layer between the cap and the end of the led-out electrode, wherein the metal diffused layer is formed of the metal forming the cap and the metal forming the led-out electrode.

12. The lead-wire according to claim 7, wherein the led-out electrode has a flat section at an opposite side to the end.

13. A method for manufacturing a lead-wire, the method comprising: (A) putting a cap over an end of led-out electrode made of metal, wherein the cap has an inner diameter greater than an outer diameter of the end of the led-out electrode, and the cap is made of metal harder than the metal forming the led-out electrode; and (B) press-fitting the end of the led-out electrode and the cap together by deforming the end of the led-out electrode inside the cap, wherein the end of the led-out electrode has an enlarged outer diameter by the press-fitting the cap on the end of the led-out electrode; and (C) welding a terminal to an outer bottom face of the cap.

14. The method for manufacturing a lead-wire according to claim 13,
wherein in step (A) an inner bottom face of the cap is brought into contact with an end face of the end of the led-out electrode, and step (B) comprises:
(B1) holding the led-out electrode at an outer peripheral wall of the led-out electrode such that the end is exposed, and
(B2) applying a pressure onto an outer bottom of the cap so as to enlarge the outer diameter of the end of the led-out electrode inside the cap.

15. The method for manufacturing a lead-wire according to claim 13 further comprising:
(D) welding an outer face of the end of the led-out electrode to an inner face of the cap, after press-fitting the outer face of the end of the led-out electrode to the inner face of the cap.

16. A method for manufacturing an electronic component, the method comprising: (A) putting a cap over an end of led-out electrode made of metal, wherein the cap has an inner diameter greater than an outer diameter of the end of the led-out electrode, and the cap is made of metal harder than the metal forming the led-out electrode; (B) press-fitting the end of the led-out electrode and the cap together by deforming the end of the led-out electrode inside the cap wherein the end of the led-out electrode has an enlarged outer diameter by the press-fitting the cap on the end of the led-out electrode; and (C) welding a terminal to an outer bottom face of the cap; and (E) connecting the other end of the led-out electrode to a functional element.

* * * * *